(12) United States Patent
Yanagisawa

(10) Patent No.: US 10,895,644 B2
(45) Date of Patent: Jan. 19, 2021

(54) PHYSICAL QUANTITY DETECTION CIRCUIT, PHYSICAL QUANTITY DETECTION APPARATUS, INERTIAL MEASUREMENT UNIT, VEHICLE POSITIONING APPARATUS, PORTABLE ELECTRONIC APPARATUS, ELECTRONIC APPARATUS, AND VEHICLE

(71) Applicant: Seiko Epson Corporation, Tokyo (JP)

(72) Inventor: Yoshinao Yanagisawa, Minowa (JP)

(73) Assignee: Seiko Epson Corporation

( * ) Notice: Subject to any disclaimer, the term of this patent is extended or adjusted under 35 U.S.C. 154(b) by 176 days.

(21) Appl. No.: 16/173,065

(22) Filed: Oct. 29, 2018

(65) Prior Publication Data

US 2019/0129042 A1 May 2, 2019

(30) Foreign Application Priority Data

Oct. 31, 2017 (JP) ................................ 2017-210805

(51) Int. Cl.
*G01S 19/23* (2010.01)
*G01S 19/26* (2010.01)
(Continued)

(52) U.S. Cl.
CPC ............ *G01S 19/23* (2013.01); *B60G 17/018* (2013.01); *B60G 17/019* (2013.01);
(Continued)

(58) Field of Classification Search
CPC .......... G01S 19/23; G01S 19/26; G01S 19/49; G01S 19/13; G01S 5/0027; G01S 5/0036;
(Continued)

(56) References Cited

U.S. PATENT DOCUMENTS

2011/0106450 A1\* 5/2011 Toda ..................... G01S 19/49
701/472
2013/0338915 A1 12/2013 Mizuochi et al.
(Continued)

FOREIGN PATENT DOCUMENTS

JP 2009-019898 A 1/2009
JP 2009008416 A \* 1/2009
(Continued)

*Primary Examiner* — Harry K Liu
(74) *Attorney, Agent, or Firm* — Harness, Dickey & Pierce, P.L.C.

(57) ABSTRACT

A physical quantity detection circuit includes a physical quantity signal generation circuit that generates a physical quantity signal according to magnitude of a physical quantity based on a detection signal output from a physical quantity detection element, an abnormality determination circuit that determines whether or not the physical quantity detection element is potentially abnormal based on a value of the physical quantity signal and an amount of change of the value of the physical quantity signal, and an abnormality diagnostic circuit that diagnoses whether or not the physical quantity detection element is abnormal if the abnormality determination circuit determines that the physical quantity detection element is potentially abnormal.

15 Claims, 15 Drawing Sheets

(51) Int. Cl.
*B60G 17/019* (2006.01)
*B60G 17/018* (2006.01)
*G01S 19/49* (2010.01)
*B60G 17/0185* (2006.01)

(52) U.S. Cl.
CPC ..... *B60G 17/0182* (2013.01); *B60G 17/0185* (2013.01); *G01S 19/26* (2013.01); *G01S 19/49* (2013.01); *B60G 2400/05* (2013.01); *B60G 2800/01* (2013.01)

(58) Field of Classification Search
CPC . G01S 5/0054; B60G 17/018; B60G 17/0182; B60G 17/0185; B60G 17/019; G01C 21/20
USPC ..................................... 342/357.51
See application file for complete search history.

(56) References Cited

U.S. PATENT DOCUMENTS

| | | |
|---|---|---|
| 2014/0203963 A1 | 7/2014 | Shimada et al. |
| 2015/0102961 A1 | 4/2015 | Tomii et al. |

FOREIGN PATENT DOCUMENTS

| | | |
|---|---|---|
| JP | 2014-137318 A | 7/2014 |
| JP | 2015-078867 A | 4/2015 |
| JP | 6094026 B2 | 3/2017 |
| JP | 2019-082440 A | 5/2019 |

\* cited by examiner

PHYSICAL QUANTITY DETECTION CIRCUIT, PHYSICAL QUANTITY DETECTION APPARATUS, INERTIAL MEASUREMENT UNIT, VEHICLE POSITIONING APPARATUS, PORTABLE ELECTRONIC APPARATUS, ELECTRONIC APPARATUS, AND VEHICLE

CROSS-REFERENCE TO RELATED APPLICATION

This nonprovisional application claims the benefit of Japanese Patent Application No. 2017-210805, filed Oct. 31, 2017, the entire disclosure of which is incorporated herein by reference.

BACKGROUND

1. Technical Field

The present invention relates to a physical quantity detection circuit, physical quantity detection apparatus, inertial measurement unit, vehicle positioning apparatus, portable electronic apparatus, electronic apparatus, and vehicle.

2. Related Art

Recently, capacitance physical quantity detection apparatuses (physical quantity sensors) that detect physical quantities (accelerations, angular velocities, etc.) using changes of capacitance values of capacitance generated between opposed electrodes provided in physical quantity detection elements according to magnitude and directions of the physical quantities have been developed. For example, capacitance acceleration detection apparatuses (acceleration sensors) and angular velocity detection apparatuses (angular velocity sensors) using the silicon MEMS (Micro Electro Mechanical System) technology are widely known.

In the capacitance physical quantity detection apparatus, for example, when sticking of the opposed electrodes to each other occurs, the capacitance becomes very large, and the physical quantity detection element outputs a detection signal as if a large acceleration were constantly applied. Or, for example, when a wire for propagating a detection signal is broken, the physical quantity detection element outputs a detection signal as if no acceleration were constantly applied. Therefore, if it is impossible to immediately detect an abnormality of the physical quantity detection element, an external apparatus that performs processing based on a physical quantity signal output from the physical quantity detection apparatus may falsely operate.

In related art, a mechanism for self-diagnosis is provided in the physical quantity detection element itself, and thereby, an abnormality is detected. However, there are problems that the element area increases, if a failure is caused in the manufacturing process, the self-diagnosis mechanism may not normally function, and, if an abnormality occurs in the element, a cause analysis of the abnormality in a non-destructive manner is difficult.

In this regard, Patent Document 1 (JP-A-2009-19898) discloses a method including stop state determining means for determining whether or not a vehicle is in a stop state, and determining whether or not output of an acceleration detection element is abnormal if the stop state is determined by the stop state determining means. It may be possible to solve the above described various problems by application of the method without the need of providing the self-diagnosis mechanism.

However, in the case where the method disclosed in Patent Document 1 is applied to the physical quantity detection apparatus, an abnormality diagnosis is impossible unless the physical quantity detection apparatus is at rest. Accordingly, it is desired that an abnormality diagnosis of the physical quantity detection element can be made not only in the case where the physical quantity detection apparatus is at rest but also in the case where the apparatus is in motion.

SUMMARY

An advantage of some aspects of the invention is to provide a physical quantity detection circuit and a physical quantity detection apparatus that can diagnose an abnormality of a physical quantity detection element even in motion. Another advantage of some aspects of the invention is to provide an inertial measurement unit that can improve reliability of inertial data to be externally transmitted using the physical quantity detection apparatus. Another advantage of some aspects of the invention is to provide a vehicle positioning apparatus that can improve reliability of a position of a vehicle to be measured using the inertial measurement unit. Another advantage of some aspects of the invention is to provide a portable electronic apparatus, electronic apparatus, and vehicle that can improve reliability of processing based on a physical quantity detected using the physical quantity detection apparatus.

The invention that is solved at least a part of the above problem, can be implemented as the following embodiments or application examples.

Application Example 1

A physical quantity detection circuit according to this application example includes a physical quantity signal generation circuit that generates a physical quantity signal according to magnitude of a physical quantity based on a detection signal output from a physical quantity detection element, an abnormality determination circuit that determines whether or not the physical quantity detection element is potentially abnormal based on a value of the physical quantity signal and an amount of change of the value of the physical quantity signal, and an abnormality diagnostic circuit that diagnoses whether or not the physical quantity detection element is abnormal if the abnormality determination circuit determines that the physical quantity detection element is potentially abnormal.

In the physical quantity detection circuit according to this application example, the value of the physical quantity signal generated when a physical quantity is applied to the normal physical quantity detection element tends to change relatively gently in a desired range, however, if an abnormality of sticking of electrodes to each other or the like occurs in the physical quantity detection element, the value of the physical quantity signal tends to become very large or steeply change. Therefore, according to the physical quantity detection circuit of the application example, whether or not the physical quantity detection element is potentially abnormal may be determined based on the value and the amount of change of the physical quantity signal. Further, if the element is potentially abnormal, whether or not the physical quantity detection element is abnormal is diagnosed, and thereby, the abnormality of the physical quantity detection element may be diagnosed even in motion.

Application Example 2

In the physical quantity detection circuit according to the application example, the abnormality determination circuit may determine that the physical quantity detection element is potentially abnormal if at least one of conditions that an absolute value of the value of the physical quantity signal is equal to or larger than a predetermined first threshold value and an absolute value of the amount of change of the value of the physical quantity signal is equal to or larger than a predetermined second threshold value is satisfied.

In the physical quantity detection circuit according to this application example, if an abnormality occurs in the physical quantity detection element, the value of the physical quantity signal tends to become very large. Accordingly, the first threshold value is appropriately set, and thereby, if the absolute value of the value of the physical quantity signal is equal to or larger than the first threshold value, the abnormality determination circuit may determine that the physical quantity detection element is potentially abnormal. Further, if an abnormality occurs in the physical quantity detection element, the value of the physical quantity signal tends to steeply change. Accordingly, the second threshold value is appropriately set, and thereby, if the absolute value of the amount of change of the value of the physical quantity signal is equal to or larger than the second threshold value, the abnormality determination circuit may determine that the physical quantity detection element is potentially abnormal. Therefore, according to the physical quantity detection circuit of the application example, the abnormality diagnostic circuit diagnoses whether or not the physical quantity detection element is abnormal if the physical quantity detection element is potentially abnormal, and thereby, may diagnose an abnormality of the physical quantity detection element even in motion.

Application Example 3

In the physical quantity detection circuit according to the application example, the first threshold value may be equal to or larger than an absolute value of a value of the physical quantity signal generated when the physical quantity at the maximum in a detectable range is applied to the physical quantity detection element.

In the physical quantity detection circuit according to this application example, the absolute value of the value of the physical quantity signal generated when an abnormality of sticking of electrodes to each other or the like occurs in the physical quantity detection element is larger than the absolute value of the value of the physical quantity signal generated when the physical quantity at the maximum in the detectable range is applied if the physical quantity detection element is normal. Therefore, according to the physical quantity detection circuit of the application example, the abnormality determination circuit may determine that the physical quantity detection element is potentially abnormal if the absolute value of the value of the physical quantity signal is equal to or larger than the first threshold value.

Application Example 4

In the physical quantity detection circuit according to the application example, the first threshold value may be equal to or larger than 90% of an absolute value of a value of the physical quantity signal generated when the physical quantity at the maximum in a detectable range is applied to the physical quantity detection element.

According to the physical quantity detection circuit of this application example, in the case where it is considered that the physical quantity equal to or larger than 90% of the detectable maximum physical quantity is hardly applied or, if applied, just instantaneously, to the physical quantity detection element, the abnormality determination circuit may determine that the physical quantity detection element is potentially abnormal if the absolute value of the value of the physical quantity signal is equal to or larger than the first threshold value.

Application Example 5

In the physical quantity detection circuit according to the application example, the second threshold value may be equal to or larger than the first threshold value.

In the physical quantity detection circuit according to this application example, if an abnormality occurs in the physical quantity detection element, the value of the physical quantity detection signal may change very greatly and the absolute value of the amount of change may be equal to or larger than the first threshold value. Therefore, according to the physical quantity detection circuit of the application example, the abnormality determination circuit may determine that the physical quantity detection element is potentially abnormal if the absolute value of the amount of change of the value of the physical quantity signal is equal to or larger than the second threshold value.

Application Example 6

In the physical quantity detection circuit according to the application example, the abnormality diagnostic circuit may generate a test signal input to the physical quantity detection element and diagnose whether or not the physical quantity determination element is abnormal based on a signal output from the physical quantity detection element in response to the test signal.

According to the physical quantity detection circuit of this application example, the test signal is supplied to the physical quantity detection element, and thereby, the same state as a state in which a physical quantity having predetermined magnitude and direction is applied is created. Therefore, the abnormality diagnostic circuit may diagnose whether or not the physical quantity detection element is abnormal based on the signal output from the physical quantity detection element.

Application Example 7

A physical quantity detection apparatus according to this application example includes any one of the physical quantity detection circuits described above and the physical quantity detection element.

According to the physical quantity detection apparatus of this application example, in the physical quantity detection circuit, whether or not the physical quantity detection element is potentially abnormal may be determined based on the value and the amount of change of the physical quantity signal. Further, if the element is potentially abnormal, whether or not the physical quantity detection element is abnormal is diagnosed, and thereby, the abnormality of the physical quantity detection element may be diagnosed even in motion.

Application Example 8

An inertial measurement unit according to this application example includes the physical quantity detection apparatus described above, a signal processing circuit that acquires the physical quantity signal output from the physical quantity detection apparatus and processes the physical quantity signal, and a communication circuit that externally transmits inertial data obtained by the processing of the signal processing circuit.

According to the inertial measurement unit of this application example, an abnormality of the physical quantity detection element can be diagnosed by the physical quantity detection apparatus even in motion, and reliability of the inertial data to be externally transmitted may be improved.

Application Example 9

A vehicle positioning apparatus according to this application example is a vehicle positioning apparatus mounted on a vehicle and measuring a position of the vehicle, including the inertial measurement unit described above, a satellite signal receiving unit that receives a satellite signal from a positioning satellite and acquires positioning information superimposed on the satellite signal, a position calculation unit that calculates the position of the vehicle based on the positioning information, an attitude calculation unit that calculates an attitude of the vehicle based on the inertial data output from the inertial measurement unit, and a position correction unit that corrects the position based on the attitude.

According to the vehicle positioning apparatus of this application example, the highly-accurate inertial data is obtained by the inertial measurement unit, and thereby, reliability of the position of the vehicle to be measured may be improved.

Application Example 10

A portable electronic apparatus according to this application example includes the physical quantity detection apparatus described above, a case housing the physical quantity detection apparatus, a processing unit housed in the case and processing output data from the physical quantity detection apparatus, a display unit housed in the case, and a light-transmissive cover that closes an opening portion of the case.

According to the portable electronic apparatus of this application example, an abnormality of the physical quantity detection element can be diagnosed by the physical quantity detection apparatus even in motion, and reliability of the processing based on the physical quantity detected by the physical quantity detection apparatus may be improved.

Application Example 11

An electronic apparatus according to this application example includes the physical quantity detection apparatus described above, and an arithmetic processing apparatus that performs arithmetic processing based on the physical quantity signal output from the physical quantity detection apparatus.

According to the electronic apparatus of this application example, an abnormality of the physical quantity detection element can be diagnosed by the physical quantity detection apparatus even in motion, and reliability of the arithmetic processing based on the physical quantity detected by the physical quantity detection apparatus may be improved.

Application Example 12

A vehicle according to this application example includes the physical quantity detection apparatus described above, and an attitude control unit that performs attitude control based on the physical quantity signal output from the physical quantity detection apparatus.

According to the vehicle of this application example, an abnormality of the physical quantity detection element can be diagnosed by the physical quantity detection apparatus even in motion, and reliability of the attitude control based on the physical quantity detected by the physical quantity detection apparatus may be improved.

BRIEF DESCRIPTION OF THE DRAWINGS

The invention will be described with reference to the accompanying drawings, wherein like numbers reference like elements.

DESCRIPTION OF EXEMPLARY EMBODIMENTS

As below, embodiments of the invention will be explained in detail using the drawings. Note that the following embodiments to be explained do not unduly limit the invention described in the appended Claims. Not all of the configurations to be explained are essential component elements of the invention.

As below, a physical quantity detection apparatus (acceleration detection apparatus) that detects accelerations as physical quantities will be explained as an example.

1. Physical Quantity Detection Apparatus

Configuration of Physical Quantity Detection Apparatus

Figure 1:
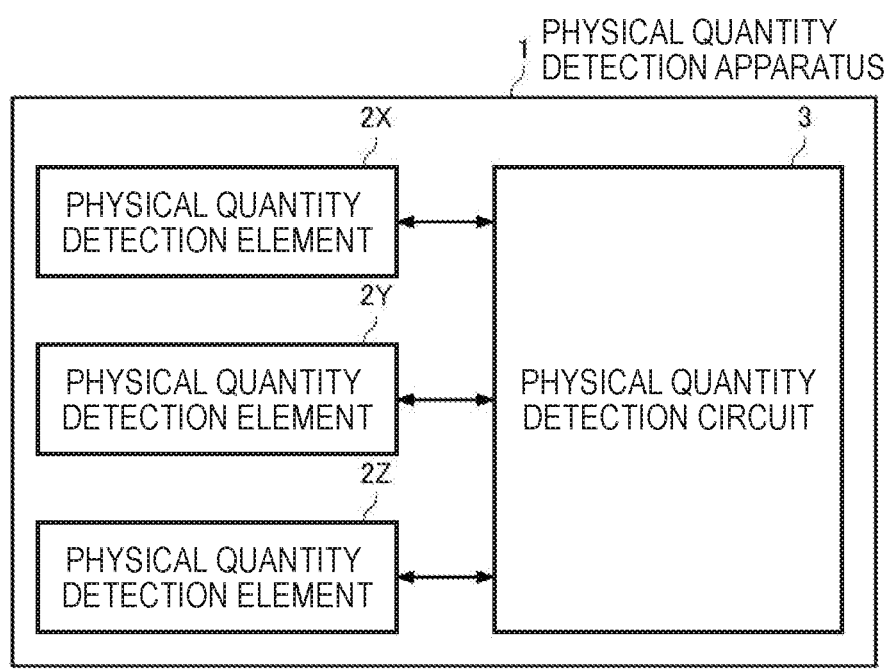
FIG. 1 shows a functional configuration of a physical quantity detection apparatus of an embodiment.

FIG. 1 shows a functional configuration of a physical quantity detection apparatus 1 of the embodiment. The physical quantity detection apparatus 1 of the embodiment detects physical quantities (here, accelerations) along three axes (X-axis, Y-axis, Z-axis) different from one another and crossing (ideally, orthogonal to) one another. As shown in FIG. 1, the physical quantity detection apparatus 1 includes physical quantity detection elements 2X, 2Y, 2Z and a physical quantity detection circuit 3.

The physical quantity detection element 2X is an element that outputs a detection signal according to the physical quantity (X-axis acceleration) applied in directions of the X-axis. The physical quantity detection element 2Y is an element that outputs a detection signal according to the physical quantity (Y-axis acceleration) applied in directions of the Y-axis. The physical quantity detection element 2Z is an element that outputs a detection signal according to the physical quantity (Z-axis acceleration) applied in directions of the Z-axis. That is, the detection axes of the physical quantity detection elements 2X, 2Y, 2Z are the X-axis, Y-axis, and Z-axis, respectively.

The physical quantity detection circuit 3 generates signals necessary for respectively driving the physical quantity detection elements 2X, 2Y, 2Z and supplies the signals to the physical quantity detection elements 2X, 2Y, 2Z. Then, the physical quantity detection circuit 3 generates an X-axis acceleration signal as a physical quantity signal according to the magnitude and the direction of the physical quantity (X-axis acceleration) applied in the X-axis directions based on the detection signal output from the physical quantity detection element 2X. Further, the physical quantity detection circuit 3 generates a Y-axis acceleration signal as a physical quantity signal according to the magnitude and the direction of the physical quantity (Y-axis acceleration) applied in the Y-axis directions based on the detection signal output from the physical quantity detection element 2Y. Furthermore, the physical quantity detection circuit 3 generates a Z-axis acceleration signal as a physical quantity signal according to the magnitude and the direction of the physical quantity (Z-axis acceleration) applied in the Z-axis directions based on the detection signal output from the physical quantity detection element 2Z.

In the embodiment, each of the physical quantity detection elements 2X, 2Y, 2Z has a fixed part in which a first fixed electrode and a second fixed electrode are provided, and a movable electrode (movable part). The first fixed electrode and the movable electrode are opposed and form a first capacity formation part. Similarly, the second fixed electrode and the movable electrode are opposed and form a second capacity formation part. When an acceleration a in the detection axis direction is applied to the physical quantity detection elements 2X, 2Y, 2Z, a force $F=m \times a$ acts on the movable part having a mass m. By the force F, the movable part is displaced relative to the fixing parts. In this regard, depending on the direction of the acceleration a, the capacitance value of the first capacity formation part decreases and the capacitance value of the second capacity formation part increases, or the capacitance value of the first capacity formation part increases and the capacitance value of the second capacity formation part decreases. Accordingly, when the acceleration a is applied to the physical quantity detection elements 2X, 2Y, 2Z while electric charge is supplied to the common end of the first capacity formation part and the second capacity formation part, electric charge (signals) respectively output from one end of the first capacity formation part and one end of the second capacity formation part forms a differential signal pair having nearly equal absolute values and opposite signs. The physical quantity detection circuit 3 generates three-axis physical quantity signals (X-axis acceleration signal, Y-axis acceleration signal, Z-axis acceleration signal) using the differential signal pairs respectively output from the physical quantity detection elements 2X, 2Y, 2Z as the detection signals.

All of the physical quantity detection elements 2X, 2Y, 2Z are differential capacitive sensors and formed using a semiconductor material such as Si (silicon) by MEMS (Micro Electro Mechanical Systems) using a semiconductor processing technique.

Structure of Physical Quantity Detection Element

Next, with the physical quantity detection element 2X that can detect the X-axis acceleration as a representative of the physical quantity detection elements 2X, 2Y, 2Z, an example of the structure thereof will be explained in detail. Note that, as the structure of the physical quantity detection element 2X, various other structures than that described as below are considered and the structure may be appropriately designed for use. Similarly, various structures are considered for the physical quantity detection element 2Y that can detect the Y-axis acceleration and the physical quantity detection element 2Z that can detect the Z-axis acceleration (not shown or explained) and may be appropriately designed for use.

Figure 2:
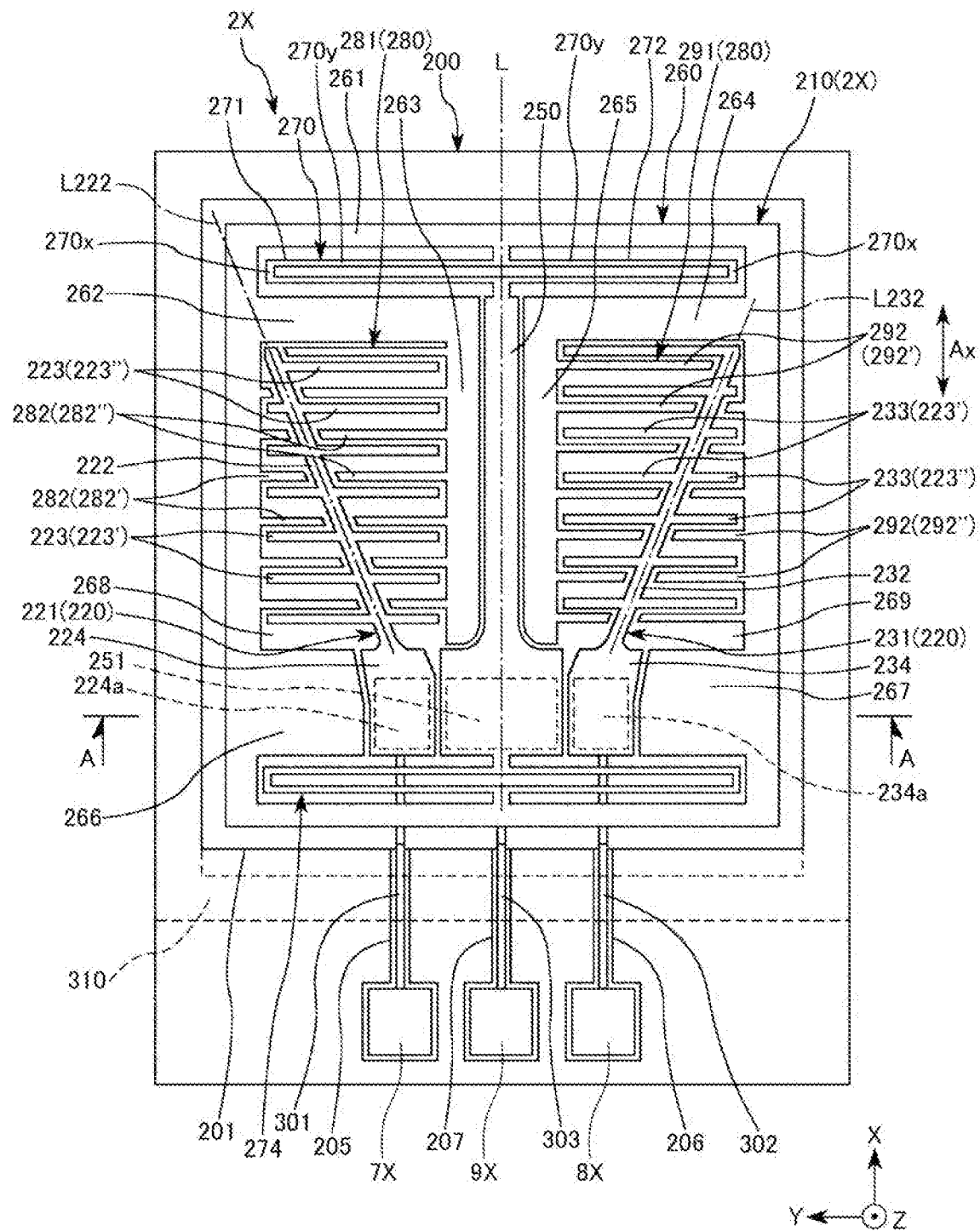
FIG. 2 is a plan view showing an example of a physical quantity detection unit including a physical quantity detection element.
Figure 3:
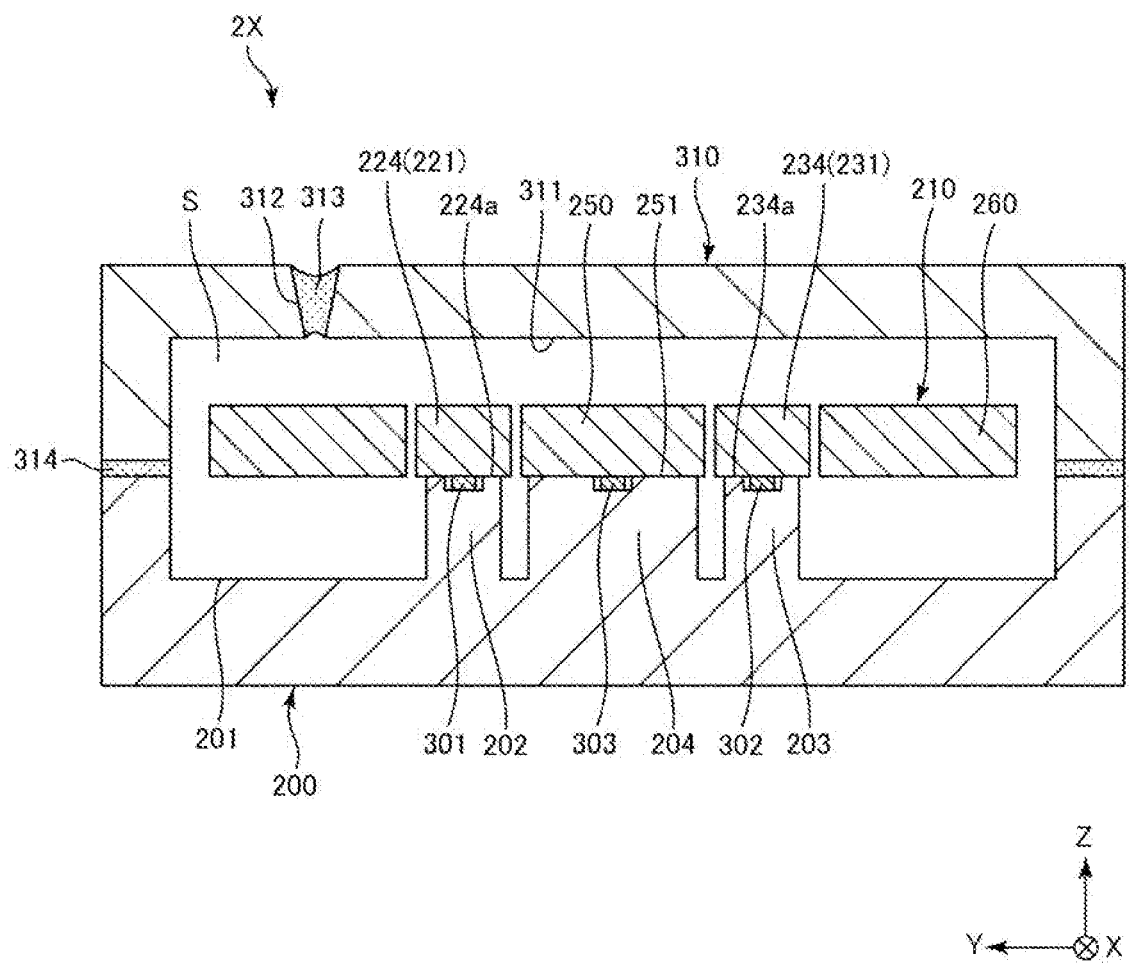
FIG. 3 is a sectional view along line A-A in FIG. 2.

FIG. 2 is a plan view showing an example of a physical quantity detection unit including the physical quantity detection element 2X. FIG. 3 is a sectional view along line A-A in FIG. 2. Hereinafter, for convenience of explanation, the near side of the paper in FIG. 2 and the upside in FIG. 3 are also referred to as "upper" and the far side of the paper in FIG. 2 and the downside in FIG. 3 are also referred to as "lower". Further, as shown in the respective drawings, three axes orthogonal to one another are referred to as an X-axis, Y-axis, and Z-axis, and directions parallel to the X-axis are also referred to as "X-axis directions", directions parallel to the Y-axis are also referred to as "Y-axis directions", directions parallel to the Z-axis are also referred to as "Z-axis directions". Furthermore, the tip end side in the arrow direction of each axis is also referred to as "plus side" and the opposite side is also referred to as "minus side".

The physical quantity detection unit shown in FIG. 2 has a substrate 200, an element part 210 (physical quantity detection element 2X) placed on the substrate 200, and a lid 310 joined to the substrate 200 to cover the element part 210. The element part 210 functions as the physical quantity detection element 2X (see FIG. 1).

The substrate 200 has a rectangular plate-like shape in a plan view. Further, the substrate 200 has a concave portion 201 opening toward the upper surface. In the plan view from the Z-axis direction, the concave portion 201 is formed to be larger than the element part 210 to include the element part 210 inside. The concave portion 201 functions as a clearance portion for preventing contact between the element part 210 and the substrate 200.

Further, as shown in FIG. 3, the substrate 200 has three projecting mounts 202, 203, 204 provided on the bottom surface of the concave portion 201. A first fixed electrode 221 is joined to the mount 202, a second fixed electrode 231 is joined to the mount 203, and a movable part supporting portion 250 is joined to the mount 204.

Further, as shown in FIG. 2, the substrate 200 has grooves 205, 206, 207 opening toward the upper surface side. One ends of the grooves 205, 206, 207 are respectively located outside of the lid 310 and the other ends are respectively connected to the concave portion 201.

As the substrate 200, a glass substrate formed using a glass material (e.g. borosilicate glass such as Pyrex glass (registered trademark)) containing alkali metal ions (movable ions) may be used. Thereby, for example, depending on the constituent material of the lid 310, the substrate 200 and the lid 310 may be joined by anodic bonding and these may be strongly joined. Further, the substrate 200 having light transmissivity is obtained, and the condition of the element part 210 may be visually recognized via the substrate 200.

Note that the substrate 200 is not limited to the glass substrate, but e.g. a silicon substrate or ceramics substrate may be used. In the case of using the silicon substrate, in view of prevention of short circuit, it is preferable to use a high-resistance silicon substrate or a silicon substrate having a surface on which a silicon oxide film (insulating oxide) is formed by thermal oxidation or the like.

As shown in FIG. 2, wires 301, 302, 303 are provided in the grooves 205, 206, 207. One end of the wire 301 within the groove 205 is exposed outside of the lid 310, and functions as a terminal 7X electrically connecting to a terminal XP (see FIG. 4) of the physical quantity detection circuit 3. As shown in FIG. 3, the other end of the wire 301 is routed to the mount 202 via the concave portion 201. Further, the wire 301 is electrically connected to the first fixed electrode 221 on the mount 202.

As shown in FIG. 2, one end of the wire 302 within the groove 206 is exposed outside of the lid 310, and functions as a terminal 8X electrically connecting to a terminal XN (see FIG. 4) of the physical quantity detection circuit 3. As shown in FIG. 3, the other end of the wire 302 is routed to the mount 203 via the concave portion 201. Further, the wire 302 is electrically connected to the second fixed electrode 231 on the mount 203.

As shown in FIG. 2, one end of the wire 303 within the groove 207 is exposed outside of the lid 310, and functions as a terminal 9X electrically connecting to a terminal COM (see FIG. 4) of the physical quantity detection circuit 3. As shown in FIG. 3, the other end of the wire 303 is routed to the mount 204 via the concave portion 201. Further, the wire 303 is electrically connected to the movable part supporting portion 250 on the mount 204.

The constituent materials of the wires 301, 302, 303 are not particularly limited, but may be e.g. metal materials including gold (Au), silver (Ag), platinum (Pt), palladium (Pd), iridium (Ir), copper (Cu), aluminum (Al), nickel (Ni), titanium (Ti), and tungsten (W), alloys containing these metal materials, and transparent conducting materials of oxides including ITO (Indium Tin Oxide), IZO (Indium Zinc Oxide), ZnO, and IGZO, and one, two, or more of the materials may be combined for use (for example, as a stacking structure of two or more layers).

As shown in FIG. 2, the lid 310 has a rectangular plate-like shape in a plan view. As shown in FIG. 3, the lid 310 has a concave portion 311 opening toward the lower surface side. The lid 310 is joined to the substrate 200 to house the element part 210 within the concave portion 311. A housing space S housing the element part 210 is formed by the lid 310 and the substrate 200.

Further, as shown in FIG. 3, the lid 310 has a communication hole 312 for communication of inside and outside of the housing space S, and the atmosphere of the housing space S may be replaced by a desired atmosphere via the communication hole 312. A sealing member 313 is placed within the communication hole 312, and the communication hole 312 is sealed by the sealing member 313.

The sealing member 313 is not particularly limited as long as the member may seal the communication hole 312, but e.g. various alloys such as a gold (Au)/tin (Sn) alloy, gold (Au)/germanium (Ge) alloy, gold (Au)/aluminum (Al) alloy, a glass material such as low-melting-point glass, or the like may be used.

An inert gas such as nitrogen, helium, or argon is enclosed in the housing space S preferably nearly at the atmospheric pressure at the operating temperature (about −40° C. to 80° C.). The housing space S is set at the atmospheric pressure, and thereby, viscous resistance increases and the damping effect is exerted and the vibration of a movable part 260 may be promptly converged (stopped). Accordingly, the detection accuracy of the X-axis acceleration by the physical quantity detection element 2X is improved.

In the embodiment, the lid 310 is formed using a silicon substrate. Note that the lid 310 is not limited to the silicon substrate, but e.g. a glass substrate or ceramics substrate may be used. The joining method of the substrate 200 and the lid 310 is not particularly limited, but may be appropriately selected depending on the materials of the substrate 200 and the lid 310. For example, anodic bonding, activated bonding of bonding joint surfaces activated by plasma application, joining using a joint material such as glass frit, diffusion bonding of bonding metal films formed on the upper surface of the substrate 200 and the lower surface of the lid 310, or the like may be used.

In the embodiment, as shown in FIG. 3, the substrate 200 and the lid 310 are joined via glass frit 314 (low-melting-point glass) as an example of the joint material. When the substrate 200 and the lid 310 are superimposed, inside and outside of the housing space S communicate via the grooves 205, 206, 207. However, the glass frit 314 is used, and thereby, the substrate 200 and the lid 310 are joined and the grooves 205, 206, 207 are sealed and the housing space S may be air-tightly sealed more easily. Note that in a case where the substrate 200 and the lid 310 are joined by anodic bonding or the like (the joining method not sealing the grooves 205, 206, 207), for example, the grooves 205, 206, 207 may be closed by an $SiO_2$ film formed by the CVD method using TEOS (tetraethoxysilane) or the like.

As shown in FIG. 2, the element part 210 (physical quantity detection element 2X) has fixed electrodes 220 fixed to the substrate 200, the movable part supporting portion 250 fixed to the substrate 200, the movable part 260 that can be displaced in the X-axis directions relative to the movable part supporting portion 250, springs 270, 274 coupling the movable part supporting portion 250 and the movable part 260, and movable electrodes 280 provided on the movable part 260. Of the parts, the movable part supporting portion 250, the movable part 260, the springs 270, 274, and the movable electrodes 280 are integrally formed. For example, the element part 210 may be formed by patterning of a silicon substrate doped with an impurity of phosphorus (P), boron (B), or the like. Further, the element part 210 is joined to the substrate 200 (mounts 202, 203, 204) by anodic bonding. Note that the material of the element part 210 and the joining method of the element part 210 to the substrate 200 are not particularly limited.

As shown in FIG. 2, the movable part supporting portion 250 has a longitudinal shape extending in the X-axis directions. Further, the movable part supporting portion 250 has a joint portion 251 joined to the mount 204 in the end on the minus side of the X-axis directions. Note that, in the embodiment, the movable part supporting portion 250 has the longitudinal shape extending in the X-axis directions, however, the shape of the movable part supporting portion 250 is not particularly limited as long as the portion exerts the function. Hereinafter, a virtual axis bisecting the movable part supporting portion 250 in the Y-axis directions in the plan view as seen from the Z-axis directions is referred to as "center axis L".

The movable part supporting portion 250 is located between the first fixed electrode 221 and the second fixed electrode 231. Thereby, the movable part supporting portion 250 may be placed at the center of the movable part 260, and the movable part 260 may be supported more stably.

As shown in FIG. 2, the movable part 260 has a frame shape in the plan view as seen from the Z-axis directions, and surrounds the movable part supporting portion 250, the springs 270, 274, the first fixed electrode 221, and the second fixed electrode 231. That is, the movable part 260 has a frame shape surrounding the fixed electrodes 220. Thereby, the mass of the movable part 260 may be made larger. Accordingly, sensitivity may be further improved and the physical quantity may be accurately detected.

Further, the movable part 260 has a first opening portion 268 (first cutoff portion) with the first fixed electrode 221 placed inside and a second opening portion 269 (second cutoff portion) with the second fixed electrode 231 placed inside. The first opening portion 268 and the second opening portion 269 are arranged side by side in the Y-axis directions. The movable part 260 is symmetric with respect to the center axis L.

The shape of the movable part 260 is explained more specifically. The movable part 260 has a frame 261 surrounding the movable part supporting portion 250, the springs 270, 274, the first fixed electrode 221, and the second fixed electrode 231, a first Y-axis extending portion 262 located on the plus side in the X-axis directions of the first opening portion 268 and extending from the frame 261 toward the minus side in the Y-axis directions, a first X-axis extending portion 263 extending from the tip end of the first Y-axis extending portion 262 toward the minus side in the X-axis directions, a second Y-axis extending portion 264 located on the plus side in the X-axis directions of the second opening portion 269 and extending from the frame 261 toward the plus side in the Y-axis directions, and a second X-axis extending portion 265 extending from the tip end of the second Y-axis extending portion 264 toward the minus side in the X-axis directions. The first Y-axis extending portion 262 and the second Y-axis extending portion 264 are respectively provided near the spring 270 and placed along the Y-axis directions of the spring 270 (extension directions of a spring piece 271), and the first X-axis extending portion 263 and the second X-axis extending portion 265 are respectively provided near the movable part supporting portion 250 and placed along the movable part supporting portion 250.

In the above described configuration, the first Y-axis extending portion 262 and the first X-axis extending portion 263 function as supporting portions that support first movable electrode fingers 282, and the second Y-axis extending portion 264 and the second X-axis extending portion 265 function as supporting portions that support second movable electrode fingers 292.

Further, the movable part 260 has a first projecting portion 266 projecting from the frame 261 into the first opening portion 268 to fill the extra space of the first opening portion 268 and a second projecting portion 267 projecting from the frame 261 into the second opening portion 269 to fill the extra space of the second opening portion 269. The first projecting portion 266 and the second projecting portion 267 are provided, and thereby, the mass of the movable part 260 may be made larger without upsizing of the movable part 260. Accordingly, the sensitivity is further improved and the physical quantity detection element 2X with higher sensitivity may be obtained.

The springs 270, 274 are elastically deformable and the springs 270, 274 are elastically deformed, and thereby, the movable part 260 may be displaced in the X-axis directions with respect to the movable part supporting portion 250. As shown in FIG. 2, the spring 270 couples the end of the movable part 260 on the plus side in the X-axis directions and the end of the movable part supporting portion 250 on the plus side in the X-axis directions, and the spring 274 couples the end of the movable part 260 on the minus side in the X-axis directions and the end of the movable part supporting portion 250 on the minus side in the X-axis directions. Thereby, the movable part 260 may be supported on both sides in the X-axis directions and the posture and behavior of the movable part 260 are stabilized. Accordingly, unnecessary vibrations may be reduced and the X-axis acceleration may be detected with higher accuracy.

The spring 270 has a pair of spring pieces 271, 272 arranged in the Y-axis directions side by side. The pair of spring pieces 271, 272 respectively have serpentine shapes in the Y-axis directions and are formed symmetrically with respect to the center axis L. The spring 270 has a part 270y extending longer in the Y-axis directions and a part extending shorter in the X-axis directions. The configuration of the spring 274 is the same as the configuration of the spring 270.

As described above, the springs 270, 274 are formed in the shapes longer in the directions of the Y-axis orthogonal to the X-axis, not along the X-axis as the detection axis, and thereby, when an X-axis acceleration is applied, displacement of the movable part 260 in the other directions (particularly, rotational displacement about the Z-axis) than the X-axis directions (detection axis directions) may be suppressed. Accordingly, unnecessary vibrations may be reduced and the X-axis acceleration may be detected with higher accuracy. Note that the configurations of the springs 270, 274 are not particularly limited as long as the portions may exert the functions thereof.

Further, as shown in FIG. 2, the fixed electrodes 220 have the first fixed electrode 221 located within the first opening portion 268 and the second fixed electrode 231 located within the second opening portion 269. The first fixed electrode 221 and the second fixed electrode 231 are arranged in the Y-axis directions side by side.

The first fixed electrode 221 has a first trunk supporting portion 224 fixed to the substrate 200, a first trunk 222 supported by the first trunk supporting portion 224, and a plurality of first fixed electrode fingers 223 extending from the first trunk 222 toward both sides in the Y-axis directions. Note that the first trunk supporting portion 224, the first trunk 222, and the respective first fixed electrode fingers 223 are integrally formed.

The first trunk supporting portion 224 has a joint part 244a joined to the mount 202. The joint part 244a is placed closer to the minus side in the X-axis directions of the first trunk supporting portion 224.

The first trunk 222 has a rod-like longitudinal shape with one end connected to the first trunk supporting portion 224, and thereby, supported by the first trunk supporting portion 224. Further, the first trunk 222 extends in a direction tilted relative to the respective X-axis and Y-axis in the plan view as seen from the Z-axis directions. More specifically, the first trunk 222 tilts so that the separation distance from the center axis L may be larger toward the tip end side. By the placement, the first trunk supporting portion 224 may be easily placed closer to the movable part supporting portion 250.

Note that the tilt of an axis L222 of the first trunk 222 relative to the X-axis is not particularly limited, but preferably from 10° to 45° and more preferably from 10° to 30°. Thereby, spread of the first fixed electrode 221 in the Y-axis directions may be suppressed and the element part 210 may be downsized.

The first fixed electrode fingers 223 extend from the first trunk 222 toward both sides in the Y-axis directions. That is, the first fixed electrode fingers 223 have first fixed electrode fingers 223' located on the plus side in the Y-axis directions and first fixed electrode fingers 223" located on the minus side in the Y-axis directions of the first trunk 222. Pluralities of the first fixed electrode fingers 223' and 223" are respectively provided apart from each other along the X-axis directions.

The lengths of the plurality of first fixed electrode fingers 223' (the lengths in the Y-axis directions) gradually decrease toward the plus side in the X-axis directions. The tip ends of the plurality of first fixed electrode fingers 223' are respectively located in the same straight line along the X-axis directions. On the other hand, the lengths of the plurality of first fixed electrode fingers 223" (the lengths in the Y-axis directions) gradually increase toward the plus side in the X-axis directions. The tip ends of the plurality of first fixed electrode fingers 223" are respectively located in the same straight line along the X-axis directions. The total lengths of the first fixed electrode fingers 223' and the first fixed electrode fingers 223" arranged in the Y-axis directions are respectively nearly the same.

The second fixed electrode 231 has a second trunk supporting portion 234 fixed to the substrate 200, a second trunk 232 supported by the second trunk supporting portion 234, and a plurality of second fixed electrode fingers 233 extending from the second trunk 232 toward both sides in the Y-axis directions. Note that the second trunk supporting portion 234, the second trunk 232, and the respective second fixed electrode fingers 233 are integrally formed.

The second trunk supporting portion 234 has a joint part 234a joined to the upper surface of the mount 203. The joint part 234a is placed closer to the minus side in the X-axis directions of the second trunk supporting portion 234.

The second trunk 232 has a rod-like longitudinal shape with one end connected to the second trunk supporting portion 234, and thereby, supported by the second trunk supporting portion 234. Further, the second trunk 232 extends in a direction tilted relative to the respective X-axis and Y-axis in the plan view as seen from the Z-axis directions. More specifically, the second trunk 232 tilts so that the separation distance from the center axis L may be larger toward the tip end side. By the placement, the second trunk supporting portion 234 may be easily placed closer to the movable part supporting portion 250.

Note that the tilt of an axis L232 of the second trunk 232 relative to the X-axis is not particularly limited, but preferably from 10° to 45° and more preferably from 10° to 30°. Thereby, spread of the second fixed electrode 231 in the Y-axis directions may be suppressed and the element part 210 may be downsized.

The second fixed electrode fingers 233 extend from the second trunk 232 toward both sides in the Y-axis directions. That is, the second fixed electrode fingers 233 have second fixed electrode fingers 233' located on the plus side in the Y-axis directions and second fixed electrode fingers 233" located on the minus side in the Y-axis directions of the second trunk 232. Pluralities of the second fixed electrode fingers 233' and 233" are respectively provided apart from each other along the X-axis directions.

The lengths of the plurality of second fixed electrode fingers 233' (the lengths in the Y-axis directions) gradually increase toward the plus side in the X-axis directions. The tip ends of the plurality of second fixed electrode fingers 233' are respectively located in the same straight line along the X-axis directions. On the other hand, the lengths of the plurality of second fixed electrode fingers 233" (the lengths in the Y-axis directions) gradually decrease toward the plus side in the X-axis directions. The tip ends of the plurality of second fixed electrode fingers 233" are respectively located in the same straight line along the X-axis directions. The total lengths of the second fixed electrode fingers 233' and the second fixed electrode fingers 233" arranged in the Y-axis directions are respectively nearly the same.

The shapes and placements of the first fixed electrode 221 and the second fixed electrode 231 are line-symmetric with respect to the center axis L (note that except that the first fixed electrode fingers 223 and the second fixed electrode fingers 233 are deviated in the X-axis directions). Particularly, in the embodiment, the first trunk 222 and the second trunk 232 respectively extend in the directions tilted relative to the X-axis so that the separation distances from the center axis L may gradually increase toward the tip end sides. By the placement, the joint part 224a of the first trunk supporting portion 224 and the joint part 234a of the second trunk supporting portion 234 may be placed closer to the joint portion 251 of the movable part supporting portion 250. Accordingly, the shift difference between the movable part 260 and the fixed electrodes 220 in the Z-axis directions when warpage and deflection occur in the substrate 200 due to heat, residual stress, or the like, specifically, the shift difference between the first movable electrode fingers 282 and the first fixed electrode fingers 223 and the shift difference between the second movable electrode fingers 292 and the second fixed electrode fingers 233 in the Z-axis directions may be suppressed more effectively.

Particularly, in the embodiment, the joint part 244a of the first trunk supporting portion 224, the joint part 234a of the second trunk supporting portion 234, and the joint portion 251 of the movable part supporting portion 250 are arranged in the Y-axis directions side by side. Thereby, the joint parts 244a, 234a may be placed even closer to the joint portion 251, and the above described advantage is more remarkable.

As shown in FIG. 2, the movable electrodes 280 have a first movable electrode 281 located within the first opening portion 268 and a second movable electrode 291 located within the second opening portion 269. The first movable electrode 281 and the second movable electrode 291 are arranged in the Y-axis directions side by side.

The first movable electrode 281 has a plurality of first movable electrode fingers 282 located on both side in the Y-axis directions of the first trunk 222 and extending in the Y-axis directions. That is, the first movable electrode fingers 282 have the first movable electrode fingers 282' located on the plus side in the Y-axis directions and the first movable electrode fingers 282" located on the minus side in the Y-axis directions of the first trunk 222. Pluralities of the first movable electrode fingers 282' and 282" are respectively provided apart from each other along the X-axis directions. The first movable electrode fingers 282' extend from the frame 261 toward the minus side in the Y-axis directions and the first movable electrode fingers 282" extend from the first X-axis extending portion 263 toward the plus side in the Y-axis directions.

The respective first movable electrode fingers 282 are located on the plus side in the X-axis directions with respect to the corresponding first fixed electrode fingers 223 and opposed to the first fixed electrode fingers 223 with gaps in between.

The lengths of the plurality of first movable electrode fingers 282' (the lengths in the Y-axis directions) gradually decrease toward the plus side in the X-axis directions. The tip ends of the plurality of first movable electrode fingers 282' are respectively located in the same straight line along the extension direction of the first trunk 222. On the other hand, the lengths of the plurality of first movable electrode fingers 282" (the lengths in the Y-axis directions) gradually increase toward the plus side in the X-axis directions. The tip ends of the plurality of first movable electrode fingers 282" are respectively located in the same straight line along the extension direction of the first trunk 222. The total lengths of the first movable electrode fingers 282' and the first movable electrode fingers 282" arranged in the Y-axis directions are respectively nearly the same.

The second movable electrode 291 has a plurality of second movable electrode fingers 292 located on both side in the Y-axis directions of the second trunk 232 and extending in the Y-axis directions. That is, the second movable electrode fingers 292 have the second movable electrode fingers 292' located on the plus side in the Y-axis directions and the second movable electrode fingers 292" located on the minus side in the Y-axis directions of the second trunk 232. Pluralities of the second movable electrode fingers 292' and 292" are respectively provided apart from each other along the X-axis directions. The second movable electrode fingers 292' extend from the second X-axis extending portion 265 toward the minus side in the Y-axis directions and the second movable electrode fingers 292" extend from the frame 261 toward the plus side in the Y-axis directions.

The respective second movable electrode fingers 292 are located on the minus side in the X-axis directions with respect to the corresponding second fixed electrode fingers 233 and opposed to the second fixed electrode fingers 233 with gaps in between.

The lengths of the plurality of second movable electrode fingers 292' (the lengths in the Y-axis directions) gradually increase toward the plus side in the X-axis directions. The tip ends of the plurality of second movable electrode fingers 292' are respectively located in the same straight line along the extension direction of the second trunk 232. On the other hand, the lengths of the plurality of second movable electrode fingers 292" (the lengths in the Y-axis directions) gradually decrease toward the plus side in the X-axis directions. The tip ends of the plurality of second movable electrode fingers 292" are respectively located in the same straight line along the extension direction of the second trunk 232. The total lengths of the second movable electrode fingers 292' and the second movable electrode fingers 292" arranged in the Y-axis directions are respectively nearly the same.

The shapes and placements of the first movable electrode 281 and the second movable electrode 291 are line-symmetric with respect to the center axis L (note that except that the first movable electrode fingers 282 and the second movable electrode fingers 292 are deviated in the X-axis directions).

When an X-axis acceleration is applied to the physical quantity detection unit having the above described configuration, the movable part 260 is displaced in the X-axis directions while elastically deforming the springs 270, 274 based on the magnitude of the X-axis acceleration. With the displacement, the gaps between the first movable electrode fingers 282 and the first fixed electrode fingers 223 and the gaps between the second movable electrode fingers 292 and the second fixed electrode fingers 233 respectively change, and, with the displacement, the magnitude of the capacitances between the first movable electrode fingers 282 and the first fixed electrode fingers 223 and the capacitances between the second movable electrode fingers 292 and the second fixed electrode fingers 233 respectively changes. Accordingly, the X-axis acceleration may be detected based on the changes of the capacitances. Note that the first fixed electrode 221 and the first movable electrode 281 form a first capacity formation part 5X (see FIG. 4) and the second fixed electrode 231 and the second movable electrode 291 form a second capacity formation part 6X (see FIG. 4).

Here, as described above, the respective first movable electrode fingers 282 are located on the plus side in the X-axis directions with respect to the corresponding first fixed electrode fingers 223 and, oppositely, the respective second movable electrode fingers 292 are located on the minus side in the X-axis directions with respect to the corresponding second fixed electrode fingers 233. That is, the respective first movable electrode fingers 282 are located on one side in the X-axis directions with respect to the first fixed electrode fingers 223 in pairs and, oppositely, the respective second movable electrode fingers 292 are located on the other side in the X-axis directions with respect to the second fixed electrode fingers 233 in pairs. Accordingly, when an X-axis acceleration is applied, the gaps between the first movable electrode fingers 282 and the first fixed electrode fingers 223 become narrower and the gaps between the second movable electrode fingers 292 and the second fixed electrode fingers 233 become wider, or, oppositely, the gaps between the first movable electrode fingers 282 and the first fixed electrode fingers 223 become wider and the gaps between the second movable electrode fingers 292 and the second fixed electrode fingers 233 become narrower. Therefore, by differential operation of first detection signals obtained from between the first fixed electrode fingers 223 and the first movable electrode fingers 282 and second detection signals obtained from between the second fixed electrode fingers 233 and the second movable electrode fingers 292, noise may be cancelled and the X-axis acceleration may be detected more accurately.

Configuration of Physical Quantity Detection Circuit

Figure 4:
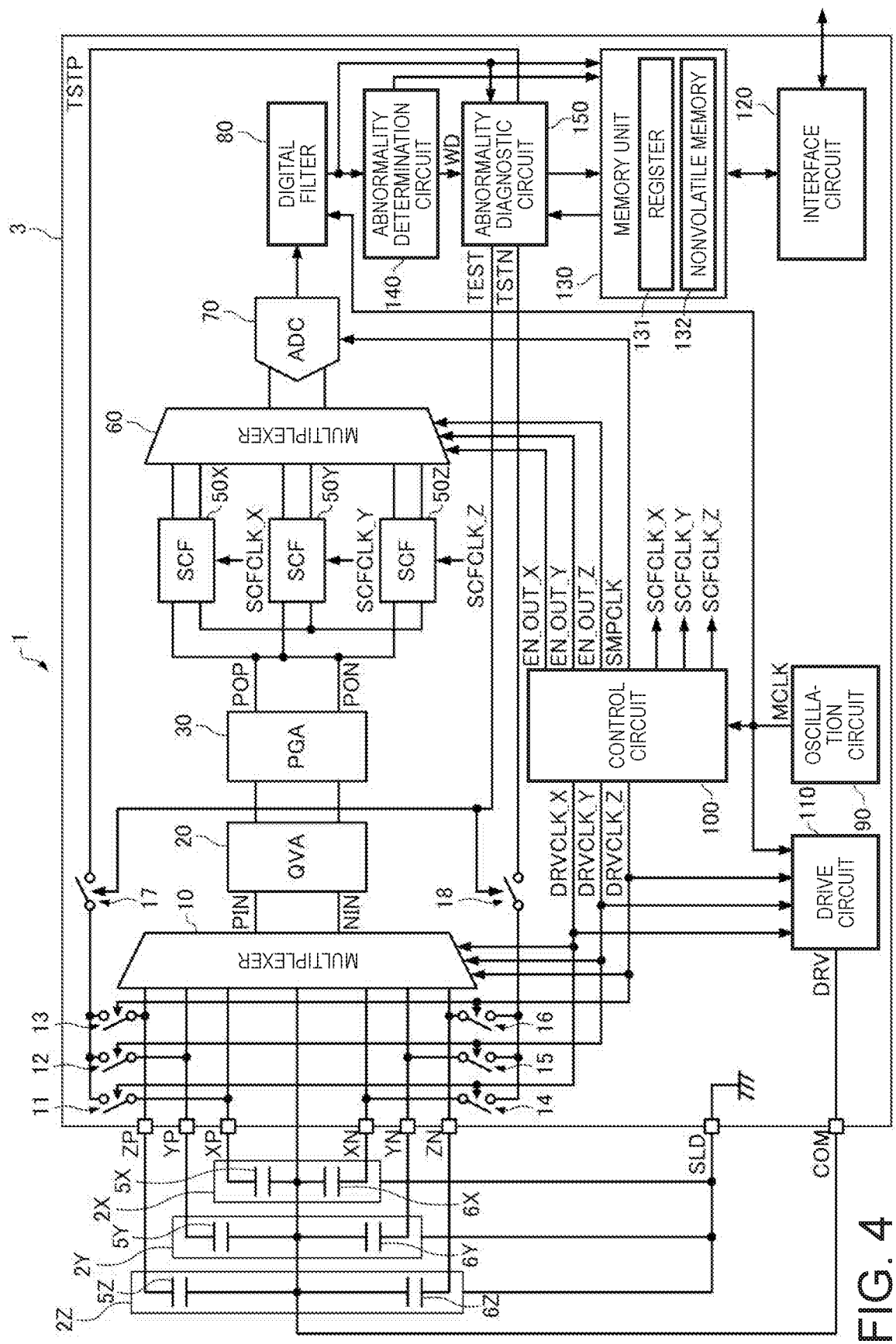
FIG. 4 shows a configuration of a physical quantity detection circuit in the embodiment.

Next, an example of the configuration of the physical quantity detection circuit 3 will be explained in detail. FIG. 4 shows the configuration of the physical quantity detection circuit 3 in the embodiment. As shown in FIG. 4, regarding the physical quantity detection element 2X, one end of the first capacity formation part 5X and one end of the second capacity formation part 6X are respectively electrically connected to the terminals XP, XN of the physical quantity detection circuit 3 via terminals (not shown) (the terminals 7X, 8X in FIG. 2), and the common end of the first capacity formation part 5X and the second capacity formation part 6X is electrically connected to the terminal COM of the physical quantity detection circuit 3 via a terminal (not shown) (the terminal 9X in FIG. 2). Similarly, regarding the physical quantity detection element 2Y, one end of a first capacity formation part 5Y and one end of a second capacity formation part 6Y are respectively electrically connected to terminals YP, YN of the physical quantity detection circuit 3 via terminals (not shown), and the common end of the first capacity formation part 5Y and the second capacity formation part 6Y is electrically connected to the terminal COM of the physical quantity detection circuit 3 via a terminal (not shown). Similarly, regarding the physical quantity detection element 2Z, one end of a first capacity formation part 5Z and one end of a second capacity formation part 6Z are respectively electrically connected to terminals ZP, ZN of the physical quantity detection circuit 3 via terminals (not shown), and the common end of the first capacity formation part 5Z and the second capacity formation part 6Z is electrically connected to the terminal COM of the physical quantity detection circuit 3 via a terminal (not shown).

As shown in FIG. 4, the physical quantity detection circuit 3 includes a multiplexer 10, switch circuits 11 to 18, a Q/V amplifier (QVA) 20, a programmable gain amplifier (PGA) 30, switched capacitor filter circuits (SCF) 50X, 50Y, 50Z, a multiplexer 60, an A/D conversion circuit (ADC) 70, a digital filter 80, an oscillation circuit 90, a control circuit 100, a drive circuit 110, an interface circuit 120, a memory unit 130, an abnormality determination circuit 140, and an abnormality diagnostic circuit 150. The physical quantity detection circuit 3 may be e.g. a single-chip integrated circuit (IC). Note that part of these elements may be omitted or changed from or another element may be added to the physical quantity detection circuit 3 of the embodiment.

The oscillation circuit 90 outputs a clock signal MCLK. For example, the circuit may be a CR oscillator, ring oscillator, or the like.

The control circuit 100 generates various clock signals (clock signals DRVCLK_X, DRVCLK_Y, DRVCLK_Z, SCFCLK_X, SCFCLK_Y, SCFCLK_Z, SMPCLK) and various control signals (control signals EN_OUT_X, EN_OUT_Y, EN_OUT_Z) based on the clock signal MCLK.

The drive circuit 110 generates a drive signal DRV for driving the physical quantity detection elements 2X, 2Y, 2Z based on the clock signal MCLK and the clock signals DRVCLK_X, DRVCLK_Y, DRVCLK_Z at a frequency (drive frequency) fd, and outputs the drive signal DRV to the terminal COM of the physical quantity detection circuit 3. The drive signal DRV has the same frequency (drive frequency fd) as that of the clock signals DRVCLK_X, DRVCLK_Y, DRVCLK_Z and applied in common to the physical quantity detection elements 2X, 2Y, 2Z via the terminal COM of the physical quantity detection circuit 3.

Note that ground patterns for shielding (not shown) are provided on the physical quantity detection elements 2X, 2Y, 2Z, and a power supply voltage VSS (e.g. 0 V) is applied to the respective ground patterns via a terminal SLD of the physical quantity detection circuit 3.

The multiplexer 10 selects one (or none) of a differential signal pair input from the terminals XP, XN, a differential signal pair input from the terminals YP, YN, and a differential signal pair input from the terminals ZP, ZN based on the clock signals DRVCLK_X, DRVCLK_Y, DRVCLK_Z mutually exclusively active (in the embodiment, at a high level) and outputs a differential signal pair PIN, NIN. Specifically, if the clock signal DRVCLK_X is at the high level (power supply voltage VDD), the multiplexer 10 selects and outputs the differential signal pair input from the terminals XP, XN as the differential signal pair PIN, NIN. If the clock signal DRVCLK_Y is at the high level, the multiplexer 10 selects and outputs the differential signal pair input from the terminals YP, YN as the differential signal pair PIN, NIN. If the clock signal DRVCLK_Z is at the high level, the multiplexer 10 selects and outputs the differential signal pair input from the terminals ZP, ZN as the differential signal pair PIN, NIN. Or, if all of the clock signals DRVCLK_X, DRVCLK_Y, DRVCLK_Z are at a low level (power supply voltage VSS (e.g. 0 V)), the multiplexer 10 outputs the differential signal pair PIN, NIN (both are zero).

Figure 5:
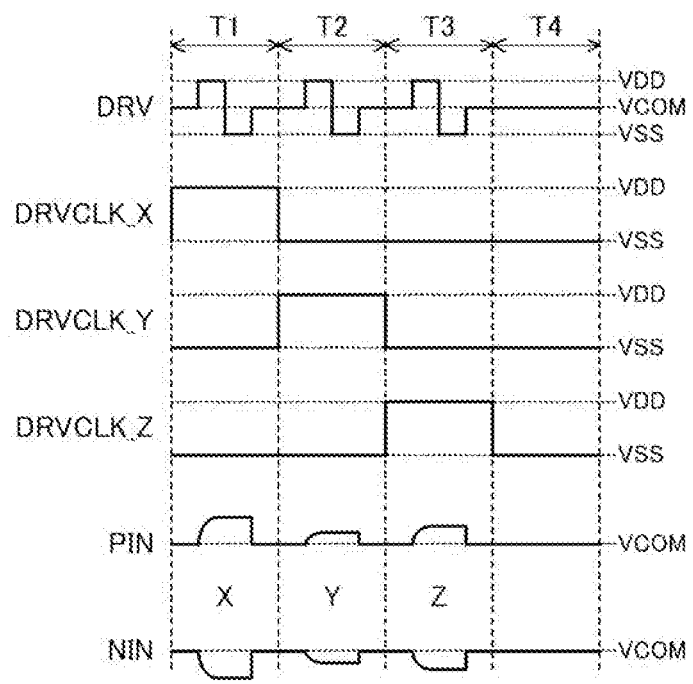
FIG. 5 shows an example of signal waveforms in the embodiment.

FIG. 5 shows an example of waveforms of the drive signal DRV, the clock signals DRVCLK_X, DRVCLK_Y, DRVCLK_Z, and the differential signal pair PIN, NIN in the embodiment. For example, periods T1 to T4 are respectively periods of N cycles (e.g. one cycle) of the clock signal MCLK. In the periods T1, T2, T3, the voltage of the drive signal DRV respectively cyclically changes sequentially from a reference voltage VCOM (e.g. VDD/2) →VDD→VSS (=0 V)→VCOM, and, in the period T4, the voltage of the drive signal DRV is VCOM.

In the periods T1 to T3, the physical quantity detection elements 2X, 2Y, 2Z are driven by the drive signal DRV in common, and a differential signal pair according to the X-axis acceleration is output from the physical quantity detection element 2X and input to the terminals XP, XN, a differential signal pair according to the Y-axis acceleration is output from the physical quantity detection element 2Y and input to the terminals YP, YN, and a differential signal pair according to the Z-axis acceleration is output from the physical quantity detection element 2Z and input to the terminals ZP, ZN. In the period T1, the clock signal DRVCLK_X is at the high level, and the differential signal pair output from the physical quantity detection element 2X is selected as the differential signal pair PIN, NIN. In the period T2, the clock signal DRVCLK_Y is at the high level, and the differential signal pair output from the physical quantity detection element 2Y is selected as the differential signal pair PIN, NIN. In the period T3, the clock signal DRVCLK_Z is at the high level, and the differential signal pair output from the physical quantity detection element 2Z is selected as the differential signal pair PIN, NIN. In the period T4, all of the clock signals DRVCLK_X, DRVCLK_Y, DRVCLK_Z are at the low level, both of the differential signal pair PIN, NIN are zero.

Returning to FIG. 4, the Q/V amplifier 20 converts the differential signal pair PIN, NIN of electric charge output from the multiplexer 10 into a differential signal pair of voltages and outputs the signals. Therefore, in the period T1, the Q/V amplifier 20 converts the differential signal pair (differential electric charge) (an example of "detection signals") output from the physical quantity detection element 2X into differential voltage signals. In the period T2, the Q/V amplifier 20 converts the differential signal pair (differential electric charge) (an example of "detection signals") output from the physical quantity detection element 2Y into differential voltage signals. In the period T3, the Q/V amplifier 20 converts the differential signal pair (differential electric charge) (an example of "detection signals") output from the physical quantity detection element 2Z into differential voltage signals. In the period T4, the Q/V amplifier 20 converts the differential signal pair (both zero) into differential voltage signals of the reference voltage VCOM.

The differential signal pair (differential voltage signals) output from the Q/V amplifier 20 is input to the programmable gain amplifier 30, and the programmable gain amplifier outputs a differential signal pair POP, PON formed by amplification of the differential signals.

The differential signal pair POP, PON output from the programmable gain amplifier 30 is input in common to the switched capacitor filter circuits 50X, 50Y, 50Z. Then, the switched capacitor filter circuit 50X samples and holds the voltage signals formed by conversion of the differential signal pair output from the physical quantity detection element 2X of the signals contained in the differential signal pair POP, PON and performs filtering processing based on the clock signal SCFCLK_X, and outputs a differential signal pair. The switched capacitor filter circuit 50Y samples and holds the voltage signals formed by conversion of the differential signal pair output from the physical quantity detection element 2Y of the signals contained in the differential signal pair POP, PON and performs filtering processing based on the clock signal SCFCLK_Y, and outputs a differential signal pair. The switched capacitor filter circuit 50Z samples and holds the voltage signals formed by conversion of the differential signal pair output from the physical quantity detection element 2X of the signals contained in the differential signal pair POP, PON and performs filtering processing based on the clock signal SCFCLK_Z, and outputs a differential signal pair. The switched capacitor filter circuits 50X, 50Y, 50Z may have the same circuit configuration as one another.

The multiplexer 60 selects and outputs one of a differential signal pair output by the switched capacitor filter circuit 50X, a differential signal pair output by the switched capacitor filter circuit 50Y, and a differential signal pair output by the switched capacitor filter circuit 50Z based on the control signals EN_OUT_X, EN_OUT_Y, EN_OUT_Z mutually exclusively active (in the embodiment, at a high level). Specifically, if the control signal EN_OUT_X is at the high level, the multiplexer 60 selects and outputs the differential signal pair output by the switched capacitor filter circuit 50X. If the control signal EN_OUT_Y is at the high level, the multiplexer 60 selects and outputs the differential signal pair output by the switched capacitor filter circuit 50Y. If the control signal EN_OUT_Z is at the high level, the multiplexer 60 selects and outputs the differential signal pair output by the switched capacitor filter circuit 50Z.

The A/D conversion circuit 70 samples the differential signal pair output by the multiplexer 60 and converts the potential difference of the differential signal pair into a digital signal based on the clock signal SMPCLK. The clock signal SMPCLK is a clock signal containing one high pulse in each high-level period of the control signals EN_OUT_X, EN_OUT_Y, EN_OUT_Z. The A/D conversion circuit 70 samples and converts the differential signal pair output from the multiplexer 60 (the differential signal pair output by the switched capacitor filter circuit 50X) into a digital signal on the rise of the clock signal SMPCLK in the high-level period of the control signal EN_OUT_X. Further, the A/D conversion circuit 70 samples and converts the differential signal pair output from the multiplexer 60 (the differential signal pair output by the switched capacitor filter circuit 50Y) into a digital signal on the rise of the clock signal SMPCLK in the high-level period of the control signal EN_OUT_Y. Furthermore, the A/D conversion circuit 70 samples and converts the differential signal pair output from the multiplexer 60 (the differential signal pair output by the switched capacitor filter circuit 50Z) into a digital signal on the rise of the clock signal SMPCLK in the high-level period of the control signal EN_OUT_Z.

As described above, the A/D conversion circuit 70 samples the differential signal pair output from the multiplexer 60 at three times and time divisionally A/D-converts the signals in the periods T1 to T4.

Note that, on the basis of the sampling theorem, in the output signals of the switched capacitor filter circuits 50X, 50Y, 50Z, signal components higher than a half of a sampling frequency fs (the frequency at which the A/D conversion circuit 70 respectively samples the output signals of the switched capacitor filter circuits 50X, 50Y, 50Z) are folded into the frequency band near the DC and become noise components by the sampling in the A/D conversion circuit 70. Accordingly, the cutoff frequency of the switched capacitor filter circuits 50X, 50Y, 50Z is set to the half of the sampling frequency fs or less so that the circuits may function as anti-aliasing filters for reducing the noise components generated by the sampling of the A/D conversion circuit 70.

The digital filter 80 performs filtering processing on the digital signal output from the A/D conversion circuit 70 based on the clock signal MCLK. High-frequency noise generated by the A/D conversion processing of the A/D conversion circuit 70 is superimposed on the digital signal output from the A/D conversion circuit 70, and the digital filter 80 functions as a low-pass filter that reduces the high-frequency noise. The digital signal output from the digital filter 80 time-divisionally contains an X-axis acceleration signal (an example of "physical quantity signal") having a digital value according to the magnitude and direction of the X-axis acceleration, a Y-axis acceleration signal (an example of "physical quantity signal") having a digital value according to the magnitude and direction of the Y-axis acceleration, and a Z-axis acceleration signal (an example of "physical quantity signal") having a digital value according to the magnitude and direction of the Z-axis acceleration. Therefore, the circuit including the Q/V amplifier 20, the programmable gain amplifier 30, the switched capacitor filter circuits 50X, 50Y, 50Z, the multiplexer 60, the A/D conversion circuit 70, and the digital filter 80 functions as a three-axis acceleration signal generation circuit (an example of "physical quantity signal generation circuit") that generates three-axis acceleration signals (X-axis acceleration signal, Y-axis acceleration signal, and Z-axis acceleration signal) according to the magnitude of the accelerations detected with respect to the X-axis, Y-axis, and Z-axis based on the differential signal pairs for the three axes output from the physical quantity detection elements 2X, 2Y, 2Z that detect the accelerations with respect to the X-axis, Y-axis, and Z-axis as three axes different from one another.

The abnormality determination circuit 140 determines whether or not the physical quantity detection elements 2X, 2Y, 2Z are potentially abnormal based on the values (digital values) of the three-axis acceleration signals (X-axis acceleration signal, Y-axis acceleration signal, and Z-axis acceleration signal) and amounts of change of the digital values, and outputs a determination signal WD indicating a determination result to the abnormality diagnostic circuit 150. For example, the respective n-bit X-axis acceleration signal, Y-axis acceleration signal, and Z-axis acceleration signal may take digital values in a range from $-2^{n-1}$ to $+2^{n-1}-1$. In the embodiment, the abnormality determination circuit 140 determines whether or not the respective physical quantity detection elements 2X, 2Y, 2Z are potentially abnormal. Then, if the abnormality determination circuit 140 determines that at least one of the physical quantity detection elements 2X, 2Y, 2Z is potentially abnormal, the circuit sets the determination signal WD to be active (at a high level in the embodiment) and updates an abnormality detection flag stored in the memory unit 130 (register 131) to "1". If the abnormality determination circuit 140 determines that the physical quantity detection elements 2X, 2Y, 2Z are normal, the circuit maintains the determination signal WD to be inactive (at a low level in the embodiment) and does not update the abnormality detection flag (maintains the present value "0" or "1"). Further, if the abnormality determination circuit 140 determines that the physical quantity detection element 2X is potentially abnormal, the circuit updates an X-axis abnormality detection flag stored in the memory unit 130 (register 131) to "1". Similarly, if the abnormality determination circuit 140 determines that the physical quantity detection element 2Y is potentially abnormal, the circuit updates a Y-axis abnormality detection flag stored in the memory unit 130 (register 131) to "1". Similarly, if the abnormality determination circuit 140 determines that the physical quantity detection element 2Z is potentially abnormal, the circuit updates a Z-axis abnormality detection flag stored in the memory unit 130 (register 131) to "1". Furthermore, if the abnormality determination circuit 140 determines that the physical quantity detection element 2X is normal, the circuit does not update the X-axis abnormality detection flag (maintains the present value "0" or "1"). Similarly, if the abnormality determination circuit 140 determines that the physical quantity detection element 2Y is normal, the circuit does not update the Y-axis abnormality detection flag (maintains the present value "0" or "1"). Similarly, if the abnormality determination circuit 140 determines that the physical quantity detection element 2Z is normal, the circuit does not update the Z-axis abnormality detection flag (maintains the present value "0" or "1").

If the abnormality determination circuit 140 determines that at least one of the physical quantity detection elements 2X, 2Y, 2Z is potentially abnormal (the determination signal WD becomes active), the abnormality diagnostic circuit 150 diagnoses whether or not the physical quantity detection elements 2X, 2Y, 2Z are abnormal. In the embodiment, the abnormality diagnostic circuit 150 updates an abnormality diagnosis execution flag to "1", then, the circuit diagnoses whether or not the respective physical quantity detection elements 2X, 2Y, 2Z are abnormal, and, when the diagnosis ends, updates the abnormality diagnosis execution flag to "0".

The abnormality diagnostic circuit 150 generates test signals TSTP, TSTN input to the physical quantity detection elements 2X, 2Y, 2Z, and diagnoses whether or not the respective physical quantity detection elements 2X, 2Y, 2Z are abnormal based on the signals respectively output from the physical quantity detection elements 2X, 2Y, 2Z in response to the test signals TSTP, TSTN. Specifically, during the abnormality diagnosis, the abnormality diagnostic circuit 150 sets a test mode signal TEST to be active (at a high level in the embodiment), and generates the predetermined test signals TSTP, TSTN. The test signal TSTP is supplied to one end of a switch circuit 17 and the test signal TSTN is supplied to one end of a switch circuit 18. The switch circuits 17, 18 are conducting when the test mode signal TEST is active (at the high level) and non-conducting when the test mode signal TEST is inactive (at the low level). Therefore, during the abnormality diagnosis, both the switch circuits 17, 18 are conducting and the test signal TSTP is supplied to respective one ends of switch circuits 11, 12, 13 via the switch circuit 17, and the test signal TSTN is supplied to respective one ends of switch circuits 14, 15, 16 via the switch circuit 18.

The switch circuits 11, 14 are conducting when the clock signal DRVCLK_X is at the high level and non-conducting when the clock signal DRVCLK_X is at the low level. Therefore, when the clock signal DRVCLK_X is at the high level, the test signals TSTP, TSTN propagate through the switch circuits 11, 14, and are output from the terminals XP, XN and supplied to one end of the first capacity formation part 5X and one end of the second capacity formation part 6X of the physical quantity detection element 2X, respectively. Then, the differential signal pair (differential currents) output from the physical quantity detection element 2X in response to the test signals TSTP, TSTN is selected by the multiplexer 10, and the abnormality diagnostic circuit 150 diagnoses whether or not the physical quantity detection element 2X is abnormal based on the digital signal output from the digital filter 80.

The switch circuits 12, 15 are conducting when the clock signal DRVCLK_Y is at the high level and non-conducting when the clock signal DRVCLK_Y is at the low level. Therefore, when the clock signal DRVCLK_Y is at the high level, the test signals TSTP, TSTN propagate through the switch circuits 12, 15, and are output from the terminals YP, YN and supplied to one end of the first capacity formation part 5Y and one end of the second capacity formation part 6Y of the physical quantity detection element 2Y, respectively. Then, the differential signal pair (differential currents) output from the physical quantity detection element 2Y in response to the test signals TSTP, TSTN is selected by the multiplexer 10, and the abnormality diagnostic circuit 150 diagnoses whether or not the physical quantity detection element 2Y is abnormal based on the digital signal output from the digital filter 80.

The switch circuits 13, 16 are conducting when the clock signal DRVCLK_Z is at the high level and non-conducting when the clock signal DRVCLK_Z is at the low level. Therefore, when the clock signal DRVCLK_Z is at the high level, the test signals TSTP, TSTN propagate through the switch circuits 13, 16, and are output from the terminals ZP, ZN and supplied to one end of the first capacity formation part 5Z and one end of the second capacity formation part 6Z of the physical quantity detection element 2Z, respectively. Then, the differential signal pair (differential currents) output from the physical quantity detection element 2Z in response to the test signals TSTP, TSTN is selected by the multiplexer 10, and the abnormality diagnostic circuit 150 diagnoses whether or not the physical quantity detection element 2Z is abnormal based on the digital signal output from the digital filter 80.

Note that the abnormality diagnostic circuit 150 may respectively make diagnoses as to whether or not the physical quantity detection elements 2X, 2Y, 2Z are abnormal continuously at pluralities of times at each time when the determination signal WD becomes active, and may determine normality only when the physical quantity detection elements 2X, 2Y, 2Z are normal at all of the times and may determine abnormality even when abnormality is determined just once.

Then, if the abnormality diagnostic circuit 150 diagnoses that at least one of the physical quantity detection elements 2X, 2Y, 2Z is abnormal, the circuit updates the abnormality detection flag to "1". If the abnormality diagnostic circuit 150 diagnoses that the physical quantity detection elements 2X, 2Y, 2Z are normal, the circuit updates the abnormality detection flag to "0". Further, if the abnormality diagnostic circuit 150 diagnoses that the physical quantity detection element 2X is abnormal, the circuit updates the X-axis abnormality detection flag to "1". Similarly, if the abnormality diagnostic circuit 150 diagnoses that the physical quantity detection element 2Y is abnormal, the circuit updates the Y-axis abnormality detection flag to "1". Similarly, if the abnormality diagnostic circuit 150 diagnoses that the physical quantity detection element 2Z is abnormal, the circuit updates the Z-axis abnormality detection flag to "1". Furthermore, if the abnormality diagnostic circuit 150 diagnoses that the physical quantity detection element 2X is normal, the circuit updates the X-axis abnormality detection flag to "0". Similarly, if the abnormality diagnostic circuit 150 diagnoses that the physical quantity detection element 2Y is normal, the circuit updates the Y-axis abnormality detection flag to "0". Similarly, if the abnormality diagnostic circuit 150 diagnoses that the physical quantity detection element 2Z is normal, the circuit updates the Z-axis abnormality detection flag to "0".

The details of the abnormality determination method by the abnormality determination circuit 140 and the abnormality diagnostic method by the abnormality diagnostic circuit 150 will be described later.

The memory unit 130 has the register 131 and a nonvolatile memory 132. Various kinds of information including various data for the respective circuits contained in the physical quantity detection circuit 3 (e.g. gain adjustment data of the programmable gain amplifier 30, filter factor of the digital filter 80) are stored in the nonvolatile memory 132. The nonvolatile memory 132 may be formed as e.g. a MONOS (Metal Oxide Nitride Oxide Silicon) memory or EEPROM (Electrically Erasable Programmable Read-Only Memory). When the physical quantity detection circuit 3 is turned on (when the power supply voltage rises from 0 V to VDD), the various data stored in the nonvolatile memory 132 are transferred to and held in the register 131 and the various data held in the register 131 are supplied to the respective circuits.

Further, the three-axis acceleration signals output from the digital filter 80 are stored as the respective n-bit acceleration data for the three axes in the register 131. Furthermore, flag information including the abnormality detection flag, the X-axis abnormality detection flag, the Y-axis abnormality detection flag, the Z-axis abnormality detection flag, and the abnormality diagnosis execution flag is stored in the register 131.

The interface circuit 120 is a circuit for communication with an external apparatus of the physical quantity detection apparatus 1. The external apparatus may write and read data in and from the memory unit 130 via the interface circuit 120. The interface circuit 120 may be e.g. a three-terminal or four-terminal SPI (Serial Peripheral Interface) interface circuit or two-terminal I²C (Inter-integrated circuit) interface circuit. For example, the external apparatus reads the acceleration data and flag information for the three axes stored in the memory unit 130 (register 131), and, if the abnormality detection flag is "0" (all of the physical quantity detection elements 2X, 2Y, 2Z are normal), may perform various kinds of processing using the acceleration data for the three axes. Or, if the abnormality detection flag is "1" (at least one of the physical quantity detection elements 2X, 2Y, 2Z is abnormal or potentially abnormal), the external apparatus may output information representing a potential abnormality. Or, the external apparatus may recognize which of the physical quantity detection elements 2X, 2Y, 2Z is potentially abnormal from the respective values of the X-axis abnormality detection flag, the Y-axis abnormality detection flag, and the Z-axis abnormality detection flag, and subsequently, may perform possible processing using the acceleration data of the normal axis without using the acceleration data of the potential abnormal axis. Or, the external apparatus may recognize whether or not the physical quantity detection apparatus 1 (physical quantity detection circuit 3) is executing the abnormality diagnosis of the physical quantity detection elements 2X, 2Y, 2Z from the value of the abnormality diagnosis execution flag, and, if the abnormality diagnosis is executing, may determine whether the respective physical quantity detection elements 2X, 2Y, 2Z are normal or abnormal after the abnormality diagnosis ends. Note that the external apparatus may clear the respective flags to "0" or not at each time of reading the flag information depending on the intended use.

Abnormality Determination Method and Abnormality Diagnostic Method

Next, the details of the abnormality determination method by the abnormality determination circuit 140 and the abnormality diagnostic method by the abnormality diagnostic circuit 150 will be explained.

In the embodiment, the abnormality determination circuit 140 determines that the physical quantity detection element 2X is potentially abnormal if at least one of conditions that the absolute value of the value of the X-axis acceleration signal output from the digital filter 80 is equal to or larger than a predetermined first threshold value LV1 and the absolute value of the amount of change of the value of the X-axis acceleration signal is equal to or larger than a predetermined second threshold value LV2 is satisfied. Similarly, the abnormality determination circuit 140 determines that the physical quantity detection element 2Y is potentially abnormal if at least one of conditions that the absolute value of the value of the Y-axis acceleration signal output from the digital filter 80 is equal to or larger than the first threshold value LV1 and the absolute value of the amount of change of the value of the Y-axis acceleration signal is equal to or larger than the second threshold value LV2 is satisfied. Similarly, the abnormality determination circuit 140 determines that the physical quantity detection element 2Z is potentially abnormal if at least one of conditions that the absolute value of the value of the Z-axis acceleration signal output from the digital filter 80 is equal to or larger than the first threshold value LV1 and the absolute value of the amount of change of the value of the Z-axis acceleration signal is equal to or larger than the second threshold value LV2 is satisfied. Here, the amount of change of the value of the X-axis acceleration signal may be e.g. a difference between temporally continuous two values of the X-axis acceleration signal. The same applies to the amount of change of the value of the Y-axis acceleration signal and the amount of change of the value of the Z-axis acceleration signal.

Here, for example, assuming that, when a range of the X-axis acceleration that can be detected in the specification is a range from −8G to +8G and an X-axis acceleration in the range from −8G to +8G is applied to the normal physical quantity detection element 2X, the value of the 13-bit X-axis acceleration signal falls in a range from −3000 to +3000, the absolute value of the value of the X-axis acceleration signal is 3000 at the maximum. In this regard, in the physical quantity detection element 2X, when an abnormality that the movable electrode (movable part 260 in FIG. 2) sticks to the first fixed electrode (first fixed electrode 221 in FIG. 2) or the second fixed electrode (second fixed electrode 231 in FIG. 2) occurs, the capacitance value of the first capacity formation part 5X or the second capacity formation part 6X becomes very large and, as a result, the absolute value of the value of the X-axis acceleration signal becomes the maximum value that can be taken or a value closer thereto. For example, the value of the 13-bit X-axis acceleration signal falls in a range from −4096 to +4095, and thereby, the absolute value of the value of the X-axis acceleration signal can take a value in a range from 0 to 4096 and is 4095, 4096, or a value closer thereto. That is, the absolute value of the value of the X-axis acceleration signal generated when sticking of the movable electrode (movable part 260) occurs in the physical quantity detection element 2X becomes larger than the absolute value of the value of the X-axis acceleration signal generated when the maximum acceleration in the detectable range in the specification is applied. The same applies to the physical quantity detection elements 2Y, 2Z.

Accordingly, to detect an abnormality of sticking of the movable electrode (movable part) in at least one of the physical quantity detection elements 2X, 2Y, 2Z, for example, the first threshold value LV1 may be equal to or larger than the absolute values of the respective values of the X-axis acceleration signal, the Y-axis acceleration signal, and the Z-axis acceleration signal generated when the maximum acceleration is applied to the physical quantity detection elements 2X, 2Y, 2Z in the detectable range. For example, in the above described example, the absolute values of the respective values of the X-axis acceleration signal, the Y-axis acceleration signal, and the Z-axis acceleration signal when +8G or −8G as the maximum acceleration is applied to the respective X-axis, Y-axis, and Z-axis are 3000, and the first threshold value LV1 may be set to 3000 or larger. Note that the upper limit value of the first threshold value LV1 is appropriately set to a predetermined value equal to or smaller than the maximum value (4096 in the above described example) that can be taken by the absolute values of the respective values of the X-axis acceleration signal, the Y-axis acceleration signal, and the Z-axis acceleration signal.

In the case where it is considered that an acceleration close to the maximum acceleration e.g. an acceleration equal to or larger than 90% of the maximum acceleration is hardly applied or, if applied, just instantaneously, to the physical quantity detection elements 2X, 2Y, 2Z, the first threshold value LV1 may be equal to or larger than 90% of the absolute values of the respective values of the X-axis acceleration signal, the Y-axis acceleration signal, and the Z-axis acceleration signal generated when the maximum acceleration is applied to the physical quantity detection elements 2X, 2Y, 2Z in the detectable range.

On the other hand, if abnormalities occur in the respective physical quantity detection elements 2X, 2Y, 2Z, the respective values of the X-axis acceleration signal, the Y-axis acceleration signal, and the Z-axis acceleration signal may greatly change within the detectable range (for example, change to the first threshold value LV1 or larger). In this regard, the second threshold value LV2 may be equal to or larger than the first threshold value LV1.

As described above, if the abnormality determination circuit 140 determines that at least one of the physical quantity detection elements 2X, 2Y, 2Z is potentially abnormal (if the determination signal WD is active), the abnormality diagnostic circuit 150 generates the test signals TSTP, TSTN input to the physical quantity detection elements 2X, 2Y, 2Z, and diagnoses whether or not the physical quantity detection elements 2X, 2Y, 2Z are abnormal based on the signals respectively output from the physical quantity detection elements 2X, 2Y, 2Z in response to the test signals TSTP, TSTN. Here, the test signals TSTP, TSTN are supplied to the physical quantity detection elements 2X, 2Y, 2Z, and thereby, the same state as a state in which acceleration having predetermined magnitude and direction is applied is created. Then, the abnormality diagnostic circuit 150 diagnoses that the physical quantity detection element 2X is normal if the difference between the value of the X-axis acceleration signal output from the digital filter 80 in the state and a value (expected value) corresponding to the predetermined magnitude and direction falls within a predetermined range, and diagnoses that the physical quantity detection element 2X is abnormal if the difference is not within the predetermined range. Similarly, the abnormality diagnostic circuit 150 diagnoses that the physical quantity detection element 2Y is normal if the difference between the value of the Y-axis acceleration signal output from the digital filter 80 in the state and a value (the expected value) corresponding to the predetermined magnitude and direction falls within a predetermined range, and diagnoses that the physical quantity detection element 2Y is abnormal if the difference is not within the predetermined range. Similarly, the abnormality diagnostic circuit 150 diagnoses that the physical quantity detection element 2Z is normal if the difference between the value of the Z-axis acceleration signal output from the digital filter 80 in the state and a value (the expected value) corresponding to the predetermined magnitude and direction falls within a predetermined range, and diagnoses that the physical quantity detection element 2Z is abnormal if the difference is not within the predetermined range.

Figure 6:
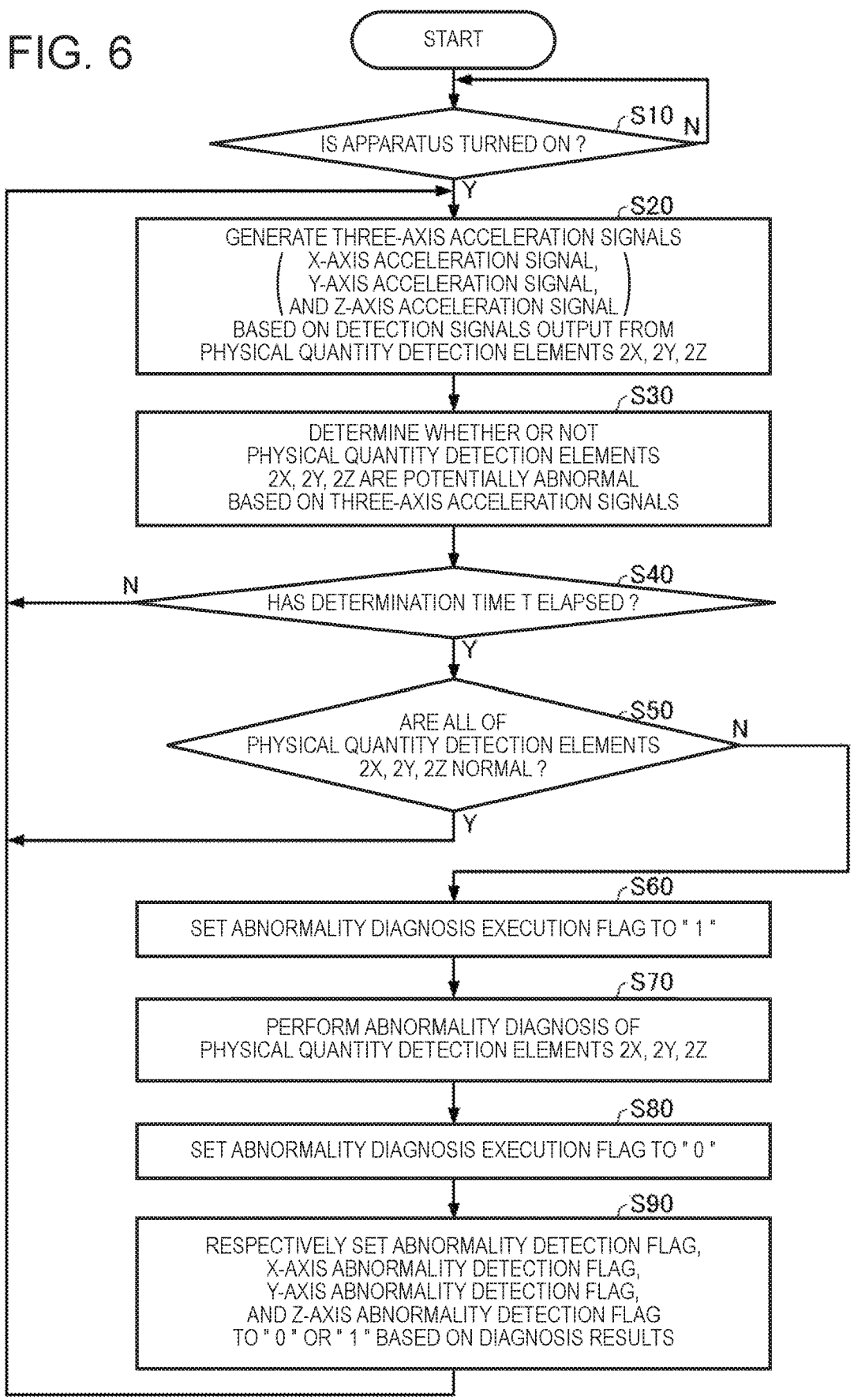
FIG. 6 is a flowchart of an abnormality determination method and an abnormality diagnostic method.

FIG. 6 is a flowchart of the abnormality determination method and the abnormality diagnostic method in the embodiment. As shown in FIG. 6, when the apparatus is turned on (Y at step S10), the physical quantity detection circuit 3 generates three-axis acceleration signals (X-axis acceleration signal, Y-axis acceleration signal, and Z-axis acceleration signal) based on the detection signals output from the physical quantity detection elements 2X, 2Y, 2Z (step S20).

Then, the physical quantity detection circuit 3 determines whether or not the physical quantity detection elements 2X, 2Y, 2Z are potentially abnormal based on the three-axis acceleration signals (step S30). Specifically, as described above, the physical quantity detection circuit 3 determines that the physical quantity detection element 2X is potentially abnormal if at least one of conditions that the absolute value of the value of the X-axis acceleration signal is equal to or larger than the first threshold value LV1 and the absolute value of the amount of change of the value of the X-axis acceleration signal is equal to or larger than the second threshold value LV2 is satisfied. The physical quantity detection circuit 3 determines that the physical quantity detection elements 2Y, 2Z are potentially abnormal if the same condition as that for the physical quantity detection element 2X is satisfied. Then, the physical quantity detection circuit 3 respectively updates the abnormality detection flag, the X-axis abnormality detection flag, the Y-axis abnormality detection flag, and the Z-axis abnormality detection flag to "1" or maintains the flags at "0" based on the determination results. The external apparatus may recognize whether or not the respective physical quantity detection elements 2X, 2Y, 2Z are potentially abnormal by also reading the flag information when reading the acceleration data for the three axes.

The physical quantity detection circuit 3 repeats the processing at steps S20 and S30 until a predetermined determination time T elapses (N at step S40). Then, after the predetermined determination time T elapses (Y at step S40), the physical quantity detection circuit 3 performs the processing at steps S20 to S40 again if all of the physical quantity detection elements 2X, 2Y, 2Z are normal (if the abnormality detection flag is "0") (Y at step S50).

On the other hand, if the physical quantity detection circuit 3 determines that at least one of the physical quantity detection elements 2X, 2Y, 2Z is potentially abnormal (N at step S50), the circuit sets the abnormality diagnosis execution flag to "1" (step S60). The external apparatus may recognize that the abnormality diagnosis of the physical quantity detection elements 2X, 2Y, 2Z is being executed because the abnormality diagnosis execution flag read out with the acceleration data for the three axes is "1".

Then, the physical quantity detection circuit 3 performs the abnormality diagnosis of the physical quantity detection elements 2X, 2Y, 2Z (step S70).

When the physical quantity detection circuit 3 ends the abnormality diagnosis, the circuit sets the abnormality diagnosis execution flag to "0" (step S80) and respectively sets the abnormality detection flag, the X-axis abnormality detection flag, the Y-axis abnormality detection flag, and the Z-axis abnormality detection flag, to "0" or "1" based on the diagnosis results (step S90), and performs the processing at step S30 and the subsequent steps again. The external apparatus may recognize that the abnormality diagnosis of the physical quantity detection elements 2X, 2Y, 2Z has ended because the abnormality diagnosis execution flag read out with the acceleration data for the three axes is "0". Further, the external apparatus may recognize whether the respective physical quantity detection elements 2X, 2Y, 2Z are normal or abnormal based on the abnormality detection flag, the X-axis abnormality detection flag, the Y-axis abnormality detection flag, and the Z-axis abnormality detection flag read out with the acceleration data for the three axes.

Figure 7:
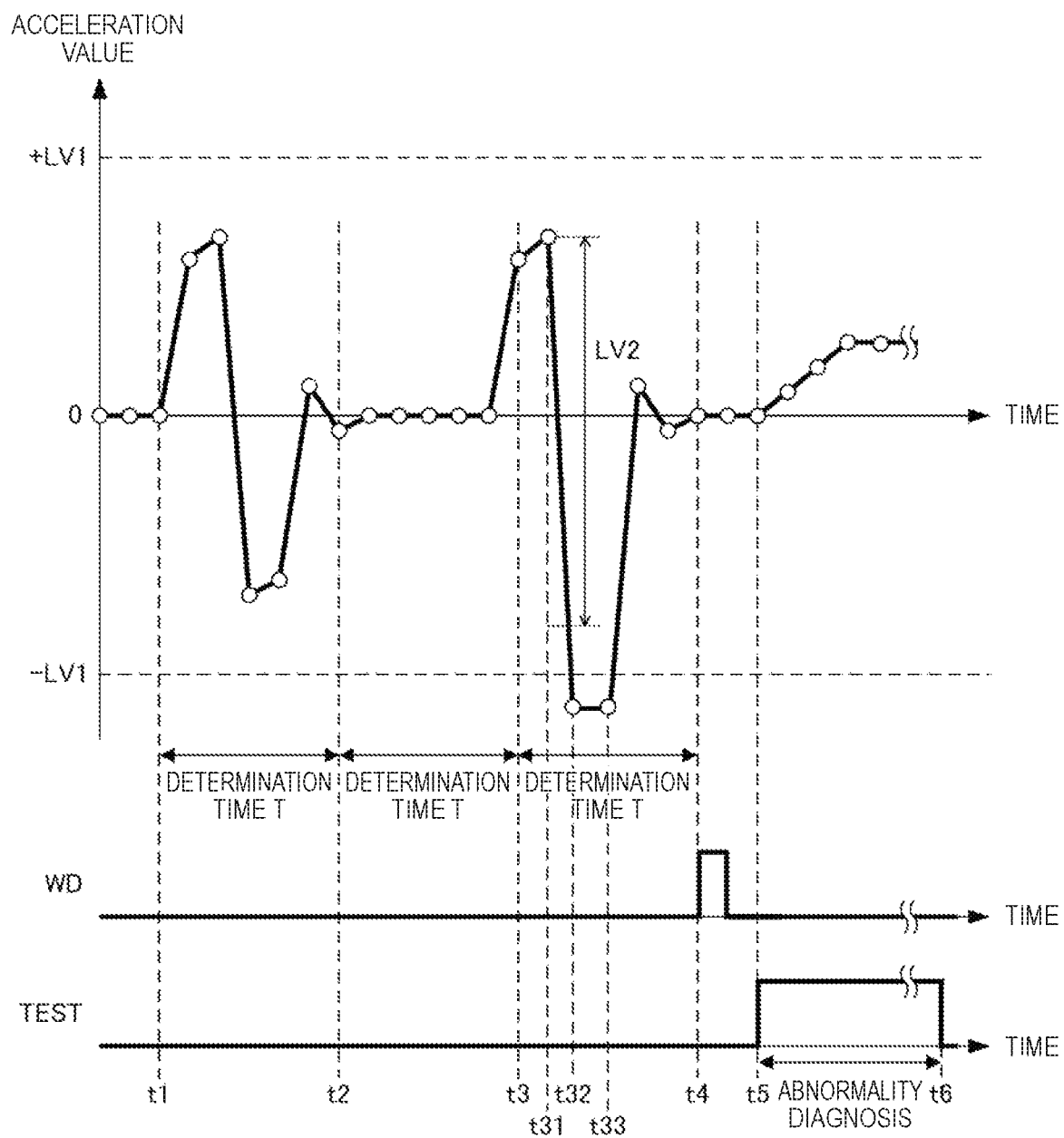
FIG. 7 shows examples of waveforms of an X-axis acceleration signal, a determination signal, and a test mode signal before and after transition to abnormality diagnosis.

FIG. 7 shows examples of waveforms of the X-axis acceleration signal, the determination signal WD, and the test mode signal TEST before and after transition to the abnormality diagnosis when the physical quantity detection elements 2Y, 2Z are normal and an abnormality occurs in the physical quantity detection element 2X.

In the examples of FIG. 7, in the determination time T from time t1 to time t2 and the determination time T from time t2 to time t3, the absolute value of the value of the X-axis acceleration signal is smaller than the first threshold value LV1 and the absolute value of the amount of change (the difference between continuous two values) of the value of the X-axis acceleration signal is smaller than the second threshold value LV2 (the same holds for the Y-axis acceleration signal and the Z-axis acceleration signal (not shown)), and thus, the abnormality diagnosis of the physical quantity detection elements 2X, 2Y, 2Z is not executed after the ends of these determination times T. On the other hand, in the determination time T from time t3 to time t4, the absolute value of the value of the X-axis acceleration signal is larger than the first threshold value LV1 at time t32 and time t33 and the absolute value of the amount of change of the value of the X-axis acceleration signal between time t31 to time t32 is larger than the second threshold value LV2. Accordingly, the determination signal WD becomes active (high level) at time t4 when the determination time T ends and the test mode signal TEST becomes active (high level) at the subsequent time t5, and the abnormality diagnosis of the physical quantity detection elements 2X, 2Y, 2Z is executed in the period from time t5 to time t6.

Figure 8:
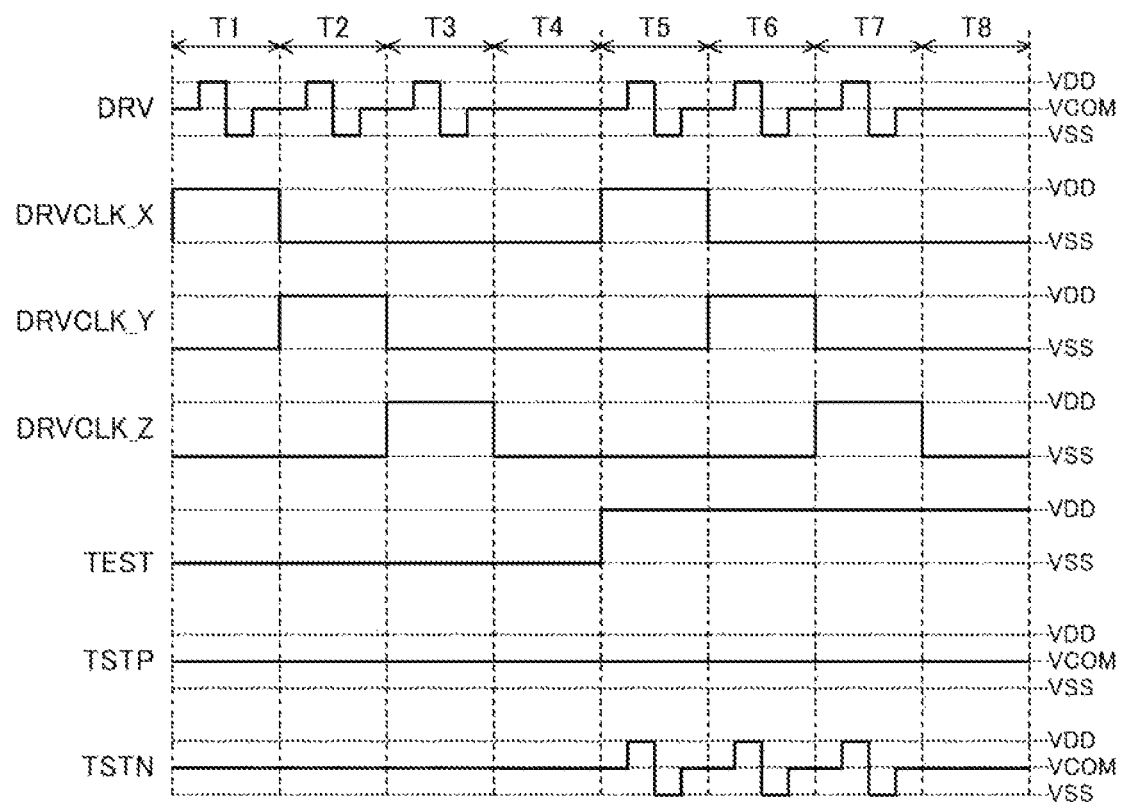
FIG. 8 shows examples of waveforms of various signals before and after transition to abnormality diagnosis.

FIG. 8 shows examples of waveforms of the drive signal DRV, the clock signals DRVCLK_X, DRVCLK_Y, DRVCLK_Z, the test mode signal TEST and the test signals TSTP, TSTN before and after transition to the abnormality diagnosis. In the examples of FIG. 8, when the test mode signal TEST becomes active (high level), in the periods T5 to T8, the voltage of the test signal TSTP becomes the reference voltage VCOM (e.g. VDD/2). In the periods T5, T6, T7, the voltage of the test signal TSTN cyclically changes sequentially from the reference voltage VCOM (e.g. VDD/2)→VDD→VSS (=0 V)→VCOM, and, in the period T8, becomes VCOM. In the period T5, the test signals TSTP, TSTN are supplied to the first fixed electrode and the second fixed electrode of the physical quantity detection element 2X, respectively, and the same state as a state in which an acceleration having predetermined magnitude and direction is applied is obtained. Then, the X-axis acceleration signal is generated based on the detection signals (currents) output from the first fixed electrode and the second fixed electrode of the physical quantity detection element 2X, the value is compared with a predetermined expected value, and thereby, whether or not the physical quantity detection element 2X is abnormal is diagnosed. Similarly, in the period T6, the test signals TSTP, TSTN are supplied to the first fixed electrode and the second fixed electrode of the physical quantity detection element 2Y, respectively, and the same state as a state in which an acceleration having predetermined magnitude and direction is applied is obtained. Then, the Y-axis acceleration signal is generated based on the detection signals (currents) output from the first fixed electrode and the second fixed electrode of the physical quantity detection element 2Y, the value is compared with the predetermined expected value, and thereby, whether or not the physical quantity detection element 2Y is abnormal is diagnosed. Similarly, in the period T7, the test signals TSTP, TSTN are supplied to the first fixed electrode and the second fixed electrode of the physical quantity detection element 2Z, respectively, and the same state as a state in which an acceleration having predetermined magnitude and direction is applied is obtained. Then, the Z-axis acceleration signal is generated based on the detection signals (currents) output from the first fixed electrode and the second fixed electrode of the physical quantity detection element 2Z, the value is compared with the predetermined expected value, and thereby, whether or not the physical quantity detection element 2Z is abnormal is diagnosed. The abnormality diagnosis of the physical quantity detection elements 2X, 2Y, 2Z may be respectively performed at pluralities of times by repetition of the period T5 to T8 at pluralities of times.

Note that the first threshold value LV1 and the second threshold value LV2 may be stored in the memory unit 130 and variable. To ensure that the abnormality diagnosis is performed if at least one of the physical quantity detection elements 2X, 2Y, 2Z is abnormal and to reduce the number of times of the abnormality diagnosis that all of the physical quantity detection elements 2X, 2Y, 2Z are normal, it is preferable to set the first threshold value LV1 and the second threshold value LV2 to appropriate values depending on the intended use.

ADVANTAGES

As described above, in the physical quantity detection apparatus 1 (physical quantity detection circuit 3) of the embodiment, the values of the X-axis acceleration signal, the Y-axis acceleration signal, and the Z-axis acceleration signal generated when an acceleration is applied to the normal physical quantity detection elements 2X, 2Y, 2Z tend to change relatively gently in a desired range, however, if an abnormality of sticking of the movable electrode (movable part) or the like occurs in at least one of the physical quantity detection elements 2X, 2Y, 2Z, at least one value of the X-axis acceleration signal, the Y-axis acceleration signal, and the Z-axis acceleration signal tends to become very large or steeply change. Therefore, according to the physical quantity detection apparatus 1 (physical quantity detection circuit 3) of the embodiment, whether or not the respective physical quantity detection elements 2X, 2Y, 2Z are potentially abnormal may be determined based on the respective values and the amounts of change of the X-axis acceleration signal, the Y-axis acceleration signal, and the Z-axis acceleration signal. Further, according to the physical quantity detection apparatus 1 (physical quantity detection circuit 3) of the embodiment, if at least one of the physical quantity detection elements 2X, 2Y, 2Z is potentially abnormal, whether or not the physical quantity detection elements 2X, 2Y, 2Z are abnormal is diagnosed, and thereby, an abnormality of the physical quantity detection elements 2X, 2Y, 2Z may be diagnosed even in motion.

Specifically, in the physical quantity detection apparatus 1 (physical quantity detection circuit 3) of the embodiment, if an abnormality of sticking of the movable electrode (movable part) or the like occurs in the respective physical quantity detection elements 2X, 2Y, 2Z, at least one value of the X-axis acceleration signal, the Y-axis acceleration signal, and the Z-axis acceleration signal tends to become very large. Accordingly, the first threshold value LV1 is appropriately set, and thereby, if the absolute values of the respective values of the X-axis acceleration signal, the Y-axis acceleration signal, and the Z-axis acceleration signal are equal to or larger than the first threshold value LV1, the abnormality determination circuit 140 may determine that the respective physical quantity detection elements 2X, 2Y, 2Z are potentially abnormal. If an abnormality occurs in the respective physical quantity detection elements 2X, 2Y, 2Z, the respective values of the X-axis acceleration signal, the Y-axis acceleration signal, and the Z-axis acceleration signal tend to steeply change. Accordingly, the second threshold value LV2 is appropriately set, and thereby, if the absolute values of the amounts of change of the respective values of the X-axis acceleration signal, the Y-axis acceleration signal, and the Z-axis acceleration signal are equal to or larger than the second threshold value LV2, the abnormality determination circuit 140 may determine that the respective physical quantity detection elements 2X, 2Y, 2Z are potentially abnormal. Therefore, according to the physical quantity detection apparatus 1 (physical quantity detection circuit 3) of the embodiment, the abnormality diagnostic circuit 150 diagnoses whether or not the physical quantity detection elements 2X, 2Y, 2Z are abnormal if at least one of the physical quantity detection elements 2X, 2Y, 2Z is potentially abnormal, and thereby, may diagnose an abnormality of the physical quantity detection elements 2X, 2Y, 2Z even in motion.

Furthermore, in the physical quantity detection apparatus 1 (physical quantity detection circuit 3) of the embodiment, if the determination that at least one of the physical quantity detection elements 2X, 2Y, 2Z is potentially abnormal is made, the abnormality diagnostic circuit 150 generates the test signals TSTP, TSTN and diagnoses whether or not the physical quantity detection elements 2X, 2Y, 2Z are abnormal. The test signals TSTP, TSTN are supplied to the physical quantity detection elements 2X, 2Y, 2Z, and thereby, the same state as a state in which an acceleration having predetermined magnitude and direction is applied is created. Therefore, the abnormality diagnostic circuit 150 may diagnose whether or not the respective physical quantity detection elements 2X, 2Y, 2Z are abnormal based on the signals respectively output from the physical quantity detection elements 2X, 2Y, 2Z.

Modified Examples

In the above described embodiment, the external apparatus reads the flag information from the physical quantity detection apparatus 1 (physical quantity detection circuit 3), and thereby, recognizes whether or not the abnormality diagnosis of the physical quantity detection elements 2X, 2Y, 2Z is being executed and recognizes whether or not the physical quantity detection elements 2X, 2Y, 2Z are abnormal. However, in the physical quantity detection apparatus 1 (physical quantity detection circuit 3), a terminal for reporting whether or not the abnormality diagnosis of the physical quantity detection elements 2X, 2Y, 2Z is being executed to the external apparatus or a terminal for reporting whether or not the physical quantity detection elements 2X, 2Y, 2Z are abnormal to the external apparatus may be provided. Or, the physical quantity detection apparatus 1 (physical quantity detection circuit 3) may add the flag information to the acceleration data and transmit the data to the external apparatus when receiving a reading command of the acceleration data from the external apparatus.

The physical quantity detection apparatus 1 of the above described embodiment diagnoses whether or not the physical quantity detection elements 2X, 2Y, 2Z are abnormal if at least one of the physical quantity detection elements 2X, 2Y, 2Z is potentially abnormal, however, may perform the abnormality diagnosis only on the element that has been determined to be potentially abnormal of the physical quantity detection elements 2X, 2Y, 2Z.

The physical quantity detection apparatus 1 of the above described embodiment detects the physical quantities (accelerations) for the three axes, however, may detect physical quantities (accelerations) for one, two, four, or more axes.

In the above described embodiment, the physical quantity detection apparatus 1 (physical quantity detection circuit 3) that detects accelerations as physical quantities is taken as an example, however, the invention can be applied to a physical quantity detection apparatus (physical quantity detection circuit) that detects various physical quantities such as angular velocities, angular accelerations, or pressure.

2. Inertial Measurement Unit (IMU)

Figure 9:
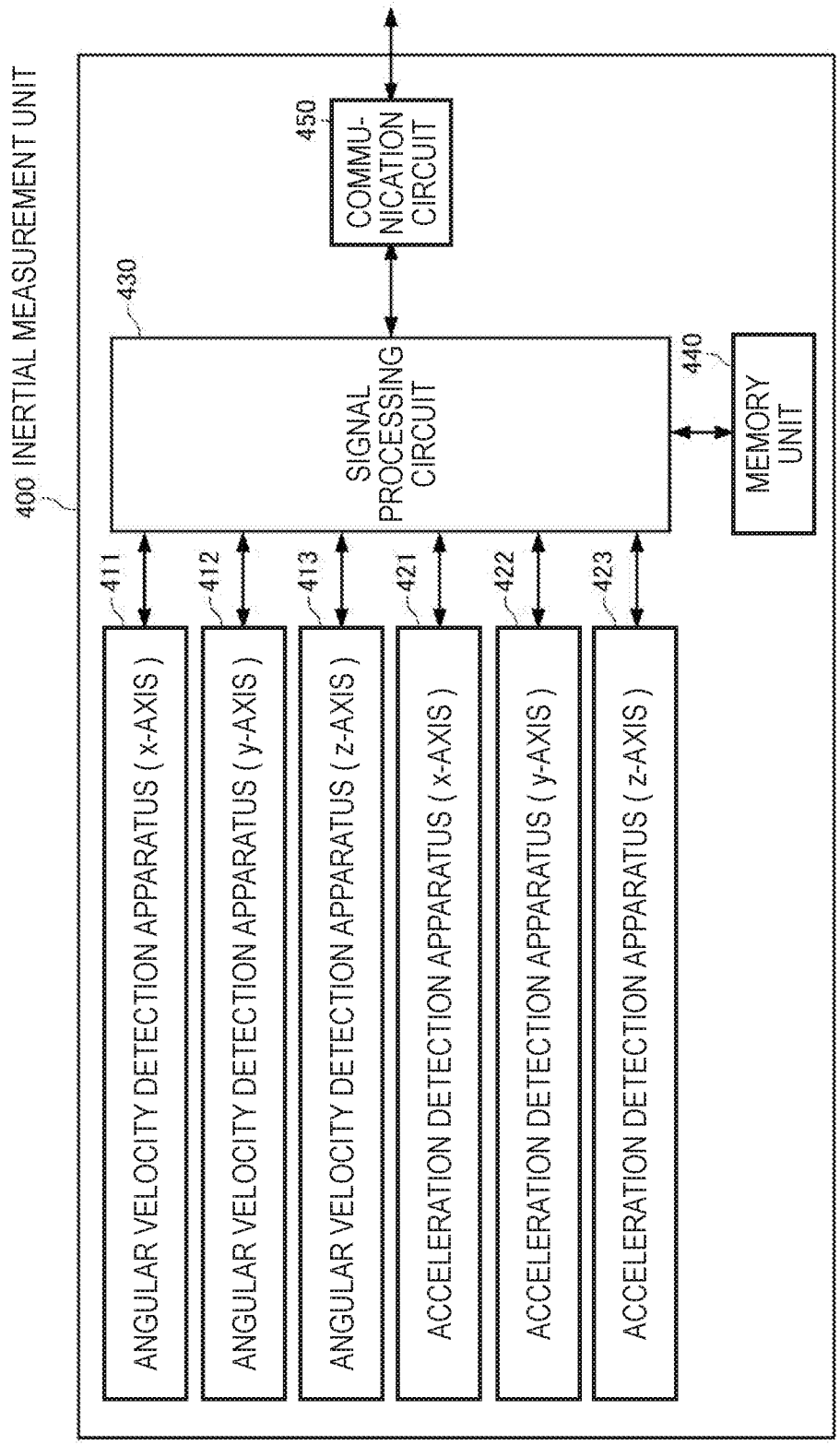
FIG. 9 shows a configuration example of an inertial measurement unit of the embodiment.

FIG. 9 shows a configuration example of an inertial measurement unit of the embodiment. As shown in FIG. 9, an inertial measurement unit 400 of the embodiment includes three angular velocity detection apparatuses 411 to 413 that respectively detect angular velocities about three axes (x-axis, y-axis, z-axis) crossing (ideally, orthogonal to) one another, three acceleration detection apparatuses 421 to 423 that respectively detect accelerations about the three axes (x-axis, y-axis, z-axis) crossing (ideally, orthogonal to) one another, a signal processing circuit 430, a memory unit 440, and a communication circuit 450. Note that, in the inertial measurement unit 400 of the embodiment, part of the component elements (respective parts) shown in FIG. 9 may be omitted or changed or another component element may be added.

The angular velocity detection apparatus 411 detects the angular velocity generated about the x-axis and outputs an angular velocity signal according to the magnitude and direction of the detected x-axis angular velocity. The angular velocity detection apparatus 412 detects the angular velocity generated about the y-axis and outputs an angular velocity signal according to the magnitude and direction of the detected y-axis angular velocity. The angular velocity detection apparatus 413 detects the angular velocity generated about the z-axis and outputs an angular velocity signal according to the magnitude and direction of the detected z-axis angular velocity.

The acceleration detection apparatus 421 detects the acceleration about the x-axis and outputs an acceleration signal according to the magnitude and direction of the detected x-axis acceleration. The acceleration detection apparatus 422 detects the acceleration about the y-axis and outputs an acceleration signal according to the magnitude and direction of the detected y-axis acceleration. The acceleration detection apparatus 423 detects the acceleration about the z-axis and outputs an acceleration signal according to the magnitude and direction of the detected z-axis acceleration.

The three angular velocity detection apparatuses 411 to 413 may be housed in a single package and form a three-axis angular velocity detection module. Similarly, the three acceleration detection apparatuses 421 to 423 may be housed in a single package and form a three-axis acceleration detection module.

The signal processing circuit 430 acquires the three-axis angular velocity signals output from the angular velocity detection apparatuses 411 to 413, acquires the three-axis acceleration signals output from the acceleration detection apparatuses 421 to 423, and processes the acquired three-axis angular velocity signals and three-axis acceleration signals. For example, the signal processing circuit 430 performs processing of sequentially A/D-converting the acquired three-axis angular velocity signals and three-axis acceleration signals and generating inertial data including three-axis angular velocity data and three-axis acceleration data, and adding time information and storing the inertial data in the memory unit 440. Further, the signal processing circuit 430 performs processing of converting (correcting) the inertial data stored in the memory unit 440 into data in the xyz coordinate system using correction parameters calculated in advance according to attachment angle errors of the respective angular velocity detection apparatuses 411 to 413 and acceleration detection apparatuses 421 to 423 (differences between the respective detection axes and the x-axis, y-axis, z-axis) and storing the data in the memory unit 440. Furthermore, the signal processing circuit 430 reads the inertial data converted into the data in the xyz coordinate system and stored in the memory unit 440 in the chronological order, generates packet data containing the time information and the inertial data, and outputs the data to the communication circuit 450.

In addition, the signal processing circuit 430 may perform offset correction processing and temperature correction processing on the inertial data or control the respective detection operations (e.g. detection cycles or the like) of the angular velocity detection apparatuses 411 to 413 and the acceleration detection apparatuses 421 to 423.

The communication circuit 450 receives the packet data (inertial data with time information) obtained by the processing of the signal processing circuit 430, converts the packet data into serial data compliant with a predetermined communication format, and externally transmits the data.

Note that the three-axis angular velocity signals output by the angular velocity detection apparatuses 411 to 413 and the three-axis acceleration signals output by the acceleration detection apparatuses 421 to 423 may be digital signals. Further, the inertial measurement unit 400 of the embodiment includes the three angular velocity detection apparatuses 411 to 413 and the three acceleration detection apparatuses 421 to 423, however, may include at least one angular velocity detection apparatus.

In the inertial measurement unit 400 of the embodiment, as at least one of the acceleration detection apparatuses 421 to 423 or at least one of the angular velocity detection apparatuses 411 to 413, the physical quantity detection apparatus 1 of the above described respective embodiments or respective modified examples may be applied. According to the inertial measurement unit 400 of the embodiment, as at least one of the acceleration detection apparatuses 421 to 423 or at least one of the angular velocity detection apparatuses 411 to 413, the physical quantity detection apparatus 1 that can diagnose an abnormality of the physical quantity detection elements 2X, 2Y, 2Z even in motion is applied, and thereby, higher reliability may be achieved.

3. Vehicle Positioning Apparatus

Figure 10:
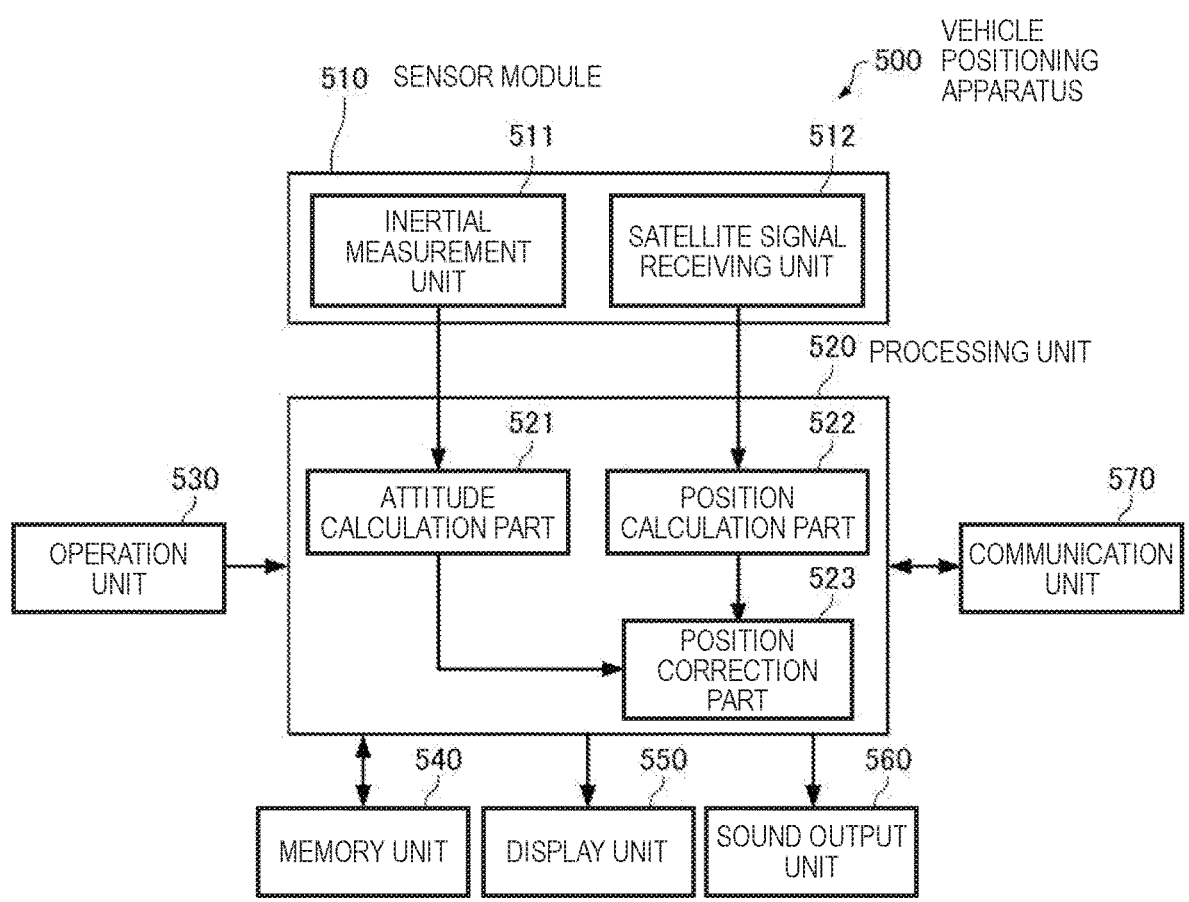
FIG. 10 shows a configuration example of a vehicle positioning apparatus of the embodiment.

FIG. 10 shows a configuration example of a vehicle positioning apparatus of the embodiment. As shown in FIG. 10, a vehicle positioning apparatus 500 of the embodiment includes a sensor module 510, a processing unit 520, an operation unit 530, a memory unit 540, a display unit 550, a sound output unit 560, and a communication unit 570, and is mounted on various vehicles. Note that, in the vehicle positioning apparatus 500 of the embodiment, part of the component elements (respective parts) shown in FIG. 10 may be omitted or changed or another component element may be added.

The sensor module 510 includes an inertial measurement unit 511 and a satellite signal receiving unit 512.

The inertial measurement unit 511 includes three angular velocity detection apparatuses (not shown) that respectively detect angular velocities generated about three axes (x-axis, y-axis, z-axis) and three acceleration detection apparatuses (not shown) that respectively detect accelerations generated about the three axes (x-axis, y-axis, z-axis). Further, the sensor module 510 performs predetermined processing (A/D conversion processing, correction processing of attachment angle errors, etc.) on the three-axis angular velocity signals detected by the three angular velocity detection apparatuses and the three-axis acceleration signals detected by the three acceleration detection apparatuses. Furthermore, the sensor module 510 outputs inertial data (three-axis angular velocity data and three-axis acceleration data) obtained by the predetermined processing to the processing unit 520. As the inertial measurement unit 511, the inertial measurement unit 400 of the above described embodiment is applied.

The satellite signal receiving unit 512 receives radio wave (satellite signal) on which a navigation message (an example of "positioning information") containing orbit information, time information, etc. of a positioning satellite such as a GPS (Global Positioning System) satellite via an antenna (not shown) is superimposed from the positioning satellite. For example, the satellite signal receiving unit 512 receives satellite signals respectively transmitted from three or more positioning satellites, demodulates (acquires) the navigation messages superimposed on the received respective satellite signals using e.g. a known technique, and outputs the respective navigation messages to the processing unit 520. Note that the satellite signal receiving unit 512 may use satellite signals from a positioning satellite of another global navigation satellite system (GNSS) than GPS or a positioning satellite of another positioning system than GNSS, or may use satellite signals from a positioning satellite of one, two, or more systems of WAAS (Wide Area Augmentation System), EGNOS (European Geostationary-Satellite Navigation Overlay Service), QZSS (Quasi Zenith Satellite System), GLONASS (GLObal NAvigation Satellite System), GALILEO, BeiDou (BeiDou Navigation Satellite System), etc.

In FIG. 10, the inertial measurement unit 511 and the satellite signal receiving unit 512 are included in the sensor module 510, however, are not necessarily integrated as the sensor module 510. That is, the inertial measurement unit 511 and the satellite signal receiving unit 512 are not necessarily housed in a single package.

The operation unit 530 is an input device including an operation key, button switch, etc., and outputs an operation signal in response to an operation by a user to the processing unit 520.

The memory unit 540 includes a ROM (Read Only Memory) for storing programs, data, etc. for various kinds of calculation processing and control processing by the processing unit 520, and a RAM (Random. Access Memory) used as a work area of the processing unit 520 for temporarily storing the programs and data read from the ROM, data input from the operation unit 530, operation results executed by the processing unit 520 according to various programs, etc.

The display unit 550 is a display device including a liquid crystal display (LCD), organic EL display (OELD: Organic Electro-Luminescence Display), and electrophoretic display, and displays various kinds of information based on a display signal input from the processing unit 520.

The sound output unit 560 is a device that outputs sound such as a speaker.

The communication unit 570 performs various kinds of control for establishing data communications between the processing unit 520 and the external apparatus.

The processing unit 520 performs various kinds of calculation processing and control processing according to the programs stored in the memory unit 540. Specifically, the processing unit 520 acquires the inertial data from the inertial measurement unit 511, acquires the navigation message from the satellite signal receiving unit 512, and performs various kinds of processing according to the acquired data and the operation signal from the operation unit 530, processing of controlling the communication unit 570 to perform data communications with the external apparatus, processing of transmitting display signals for displaying various kinds of information by the display unit 550, processing of outputting various kinds of sound by the sound output unit 560, etc.

Particularly, in the embodiment, the processing unit 520 executes the programs stored in the memory unit 540, and thereby, functions as respective parts of an attitude calculation part 521, a position calculation part 522, and a position correction part 523.

The attitude calculation part 521 calculates an attitude of a vehicle on which the vehicle positioning apparatus 500 is mounted using e.g. a known technique based on the inertial data output from the inertial measurement unit 511.

The position calculation part 522 calculates the position of the vehicle based on the navigation message output from the satellite signal receiving unit 512. Specifically, the position calculation part 522 calculates respective distances between the vehicle on which the vehicle positioning apparatus 500 is mounted and three or more positioning satellites using information including sending times of the satellite signals contained in the three or more navigation messages output from the satellite signal receiving unit 512 and radio wave propagation delays at reception. Then, the position calculation part 522 calculates the position of the vehicle from the calculated distances.

The position correction part 523 corrects the position of the vehicle calculated by the position calculation part 522 based on the attitude of the vehicle calculated by the attitude calculation part 521. For example, the position correction part 523 may calculate an inclination angle of the vehicle relative to the horizontal plane from the attitude of the vehicle, and correct the position of the vehicle on the horizontal plane to a position to which the vehicle moves based on the calculated inclination angle.

The processing unit 520 displays the information including the position and attitude of the vehicle by the display unit 550 or outputs the information by the sound output unit 560, or transmits the information to the external apparatus via the communication unit 570.

Note that the satellite signal receiving unit 512 receives the respective satellite signals and demodulates the navigation messages and the position calculation part 522 calculates the distances between the vehicle and the respective positioning satellites using the navigation messages and calculates the position of the vehicle, however, the satellite signal receiving unit 512 may calculate the distances between the vehicle and the respective positioning satellites and calculate the position of the vehicle. That is, the satellite signal receiving unit 512 may perform at least a part of the processing performed by the position calculation part 522.

According to the vehicle positioning apparatus 500 of the embodiment, the inertial measurement unit 400 that can achieve higher measurement accuracy is applied as the inertial measurement unit 511, and thereby, for example, the position, attitude, etc. of the vehicle may be measured with higher accuracy.

4. Electronic Apparatuses

Figure 11:
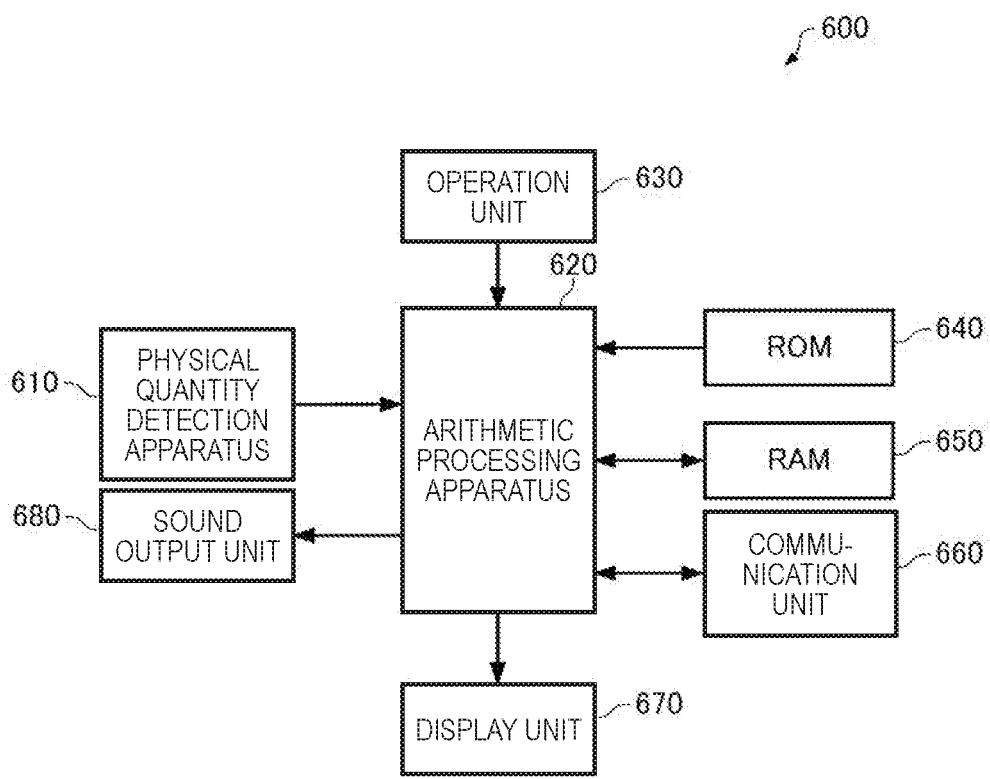
FIG. 11 is a functional block diagram of an electronic apparatus of the embodiment.

FIG. 11 shows an example of a functional block diagram of an electronic apparatus of the embodiment. As shown in FIG. 11, an electronic apparatus 600 of the embodiment includes a physical quantity detection apparatus 610, an arithmetic processing apparatus 620, an operation unit 630, a ROM 640, a RAM 650, a communication unit 660, a display unit 670, and a sound output unit 680. Note that, in the electronic apparatus 600 of the embodiment, part of the component elements (respective parts) shown in FIG. 11 may be omitted or changed or another component element may be added.

The physical quantity detection apparatus 610 respectively detects physical quantities generated on one or more axes (two axes, three axes, four axes, or more) and outputs physical quantity signals to the arithmetic processing apparatus 620. As the physical quantity detection apparatus 610, the physical quantity detection apparatus 1 of the above described respective embodiments or respective modified examples is applied.

The arithmetic processing apparatus 620 performs various kinds of calculation processing and control processing according to the programs stored in the ROM 640 etc. Specifically, the arithmetic processing apparatus 620 performs arithmetic processing (e.g. various kinds of calculation processing, control processing, etc.) based on the physical quantity signals output from the physical quantity detection apparatus 610. Further, the arithmetic processing apparatus 620 performs various kinds of processing according to the operation signal from the operation unit 630, processing of controlling the communication unit 660 to perform data communications with the external apparatus, processing of transmitting display signals for displaying various kinds of information by the display unit 670, processing of outputting various kinds of sound by the sound output unit 680, etc.

The operation unit 630 is an input device including an operation key, button switch, etc., and outputs an operation signal in response to an operation by a user to the arithmetic processing apparatus 620.

The ROM 640 stores programs, data, etc. for various kinds of calculation processing and control processing by the arithmetic processing apparatus 620.

The RAM 650 is used as a work area of the arithmetic processing apparatus 620 for temporarily storing the programs and data read from the ROM 640, data input from the operation unit 630, operation results executed by the arithmetic processing apparatus 620 according to various programs, etc.

The communication unit 660 performs various kinds of control for establishing data communications between the arithmetic processing apparatus 620 and the external apparatus.

The display unit 670 is a display device including a liquid crystal display (LCD), organic EL display (OELD), and electrophoretic display, or the like and displays various kinds of information based on a display signal input from the arithmetic processing apparatus 620.

The sound output unit 680 is a device that outputs sound such as a speaker.

According to the electronic apparatus 600 of the embodiment, the physical quantity detection apparatus 1 that can diagnose an abnormality of the physical quantity detection elements 2X, 2Y, 2Z even in motion is applied as the physical quantity detection apparatus 610, and thereby, higher reliability of e.g. processing based on changes in physical quantities (e.g. control according to the attitude or the like) may be improved.

As the electronic apparatus 600, various electronic apparatuses are considered. For example, the apparatus includes a seismometer, work robot, health monitoring apparatus, unmanned driving apparatus, personal computer (e.g. mobile personal computer, laptop personal computer, tablet personal computer), a mobile terminal such as a cell phone, digital camera, inkjet ejection apparatus (e.g. inkjet printer), storage area network equipment such as a router or switch, local area network equipment, equipment for mobile terminal base station, television, video camera, video recorder, car navigation system, pager, personal digital assistance (with or without communication function), electronic dictionary, calculator, electronic game machine, game controller, word processor, work station, videophone, security television monitor, electronic binoculars, POS (point of sale) terminal, medical apparatus (e.g., electronic thermometer, sphygmomanometer, blood glucose meter, electrocardiographic measurement apparatus, ultrasonic diagnostic apparatus, or electronic endoscope), fish finder, various measurement instruments, meters and gauges (e.g., meters for vehicles, aircrafts, and ships), flight simulator, head mounted display, motion trace, motion tracking, motion controller, PDR (pedestrian dead reckoning), etc.

Figure 12:
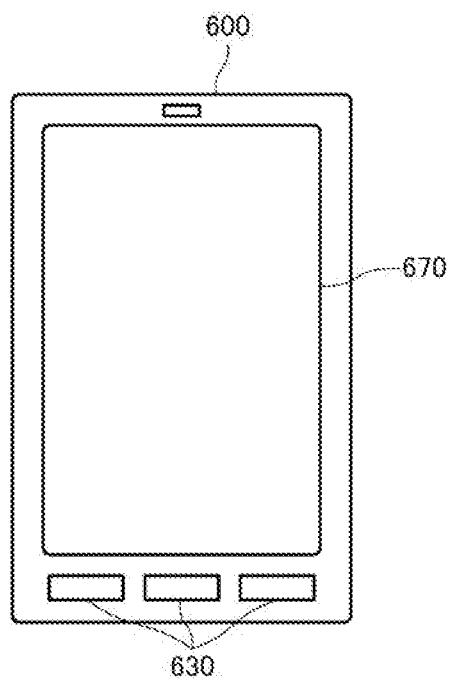
FIG. 12 shows an example of an appearance of a smartphone as an example of the electronic apparatus.
Figure 13:
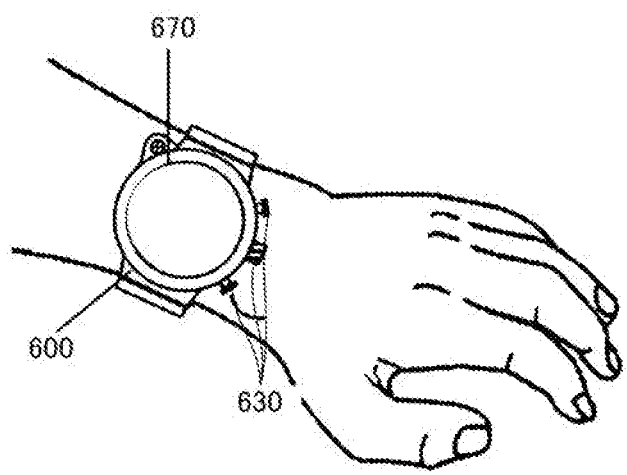
FIG. 13 shows an example of an appearance of an arm-worn portable apparatus as an example of the electronic apparatus.

FIG. 12 shows an example of an appearance of a smartphone as an example of the electronic apparatus 600, and FIG. 13 shows an example of an appearance of an arm-worn portable apparatus as an example of the electronic apparatus 600. The smartphone as the electronic apparatus 600 shown in FIG. 12 includes buttons as the operation unit 630 and an LCD as the display unit 670. The arm-worn portable apparatus as the electronic apparatus 600 shown in FIG. 13 includes buttons and a watch stem as the operation unit 630 and an LCD as the display unit 670. To these electronic apparatuses 600, the physical quantity detection apparatus 1 that can diagnose an abnormality of the physical quantity detection elements 2X, 2Y, 2Z even in motion is applied as the physical quantity detection apparatus 610, and thereby, reliability of e.g. processing based on changes in physical quantities (e.g. display control according to the attitude) may be improved.

Further, there is a wristwatch-type activity meter (active tracker) as one of the portable electronic apparatuses as an example of the electronic apparatus 600. The wristwatch-type activity meter is worn on a part such as a wrist (subject) with a band or the like, includes a display unit in digital display, and can make wireless communications. The physical quantity detection apparatus 1 according to the above described embodiment is incorporated into the wristwatch-type activity meter.

In the liquid crystal display (LCD) forming the display unit 670, according to various detection modes, e.g. position information using GPS and a geomagnetic sensor, motion information including a movement quantity and a motion quantity using an acceleration sensor, angular velocity sensor, or the like, biological information including a pulse rate using a pulse wave sensor or the like, or time information including the present time, etc. are displayed.

Figure 14:
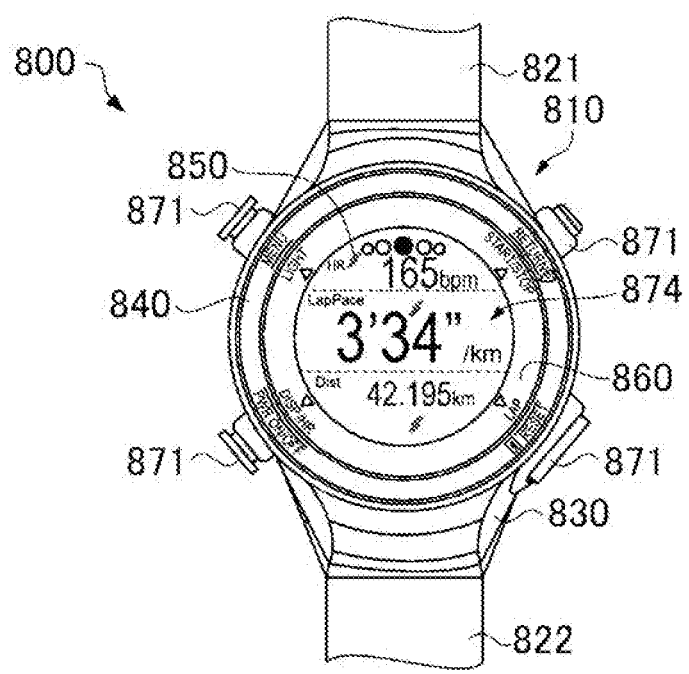
FIG. 14 shows an example of an appearance of a wrist apparatus (wristwatch-type activity meter) as an example of the electronic apparatus.

FIG. 14 is a plan view of a wrist apparatus 800 (wristwatch-type activity meter) according to an embodiment of the portable electronic apparatus 600. The wrist apparatus 800 may be widely applied to a running watch, runners watch, runners watch adapted to multi-sport such as duathlon or triathlon, outdoor watch, and satellite positioning system e.g. GPS watch equipped with GPS.

The wrist apparatus 800 is worn on a given part (e.g. wrist) of a user (wearer), and may detect position information and motion information of the user. The wrist apparatus includes an apparatus main body 810 worn on the user and detecting position information and motion information, and a first band portion 821 and a second band portion 822 attached to the apparatus main body 810 for the apparatus main body 810 to be worn on the user. Note that the wrist apparatus 800 may be provided with e.g. a function of detecting biological information such as pulse wave information and a function of acquiring time information in addition to the position information and the motion information of the user.

In the apparatus main body 810, a bottom case (not shown) as a case is placed on the side worn on the user and a top case 830 as a case having an opening portion opening toward the front side is placed on the opposite side to the side worn on the user. Here, the bottom case and the top case 830 form a case. A bezel 840 is provided on the outside of the opening portion located on the front side (top case 830) of the apparatus main body 810, and a dial window (e.g. glass plate) 850 placed inside of the bezel 840 and adjacent to the bezel 840 as a top plate portion (outer wall) that protects the internal structure is provided. The dial window 850 functions as a light transmissive cover and is placed to close the opening portion of the top case 830. A plurality of operation parts 871 (operation buttons) are provided on the side surface of the front side (top case 830) of the apparatus main body 810. Note that indications that can be visually recognized from the front side may be provided on the bezel 840.

The apparatus main body 810 has a display unit 874 formed using a liquid crystal display (LCD) placed immediately below the dial window 850 and a moisture absorbing member 860 placed between the outer edge portion of the dial window 850 and the display unit 874, and the display unit 874 and the moisture absorbing member 860 are housed in the case. Note that indications that can be visually recognized from the front side may be provided on the moisture absorbing member 860. The apparatus main body 810 may be adapted so that the user can view the indications on the display unit 874 and the indications on the moisture absorbing member 860 via the dial window 850. That is, in the wrist apparatus 800 of the embodiment, various kinds of information such as the detected position information and motion information or time information may be displayed on the display unit 874 for presentation of the indications to the user from the top side of the apparatus main body 810. Further, a pair of band attachment portions (not shown) as connecting portions between the first band portion 821 and the second band portion 822 are provided on both sides of the bottom case.

Figure 15:
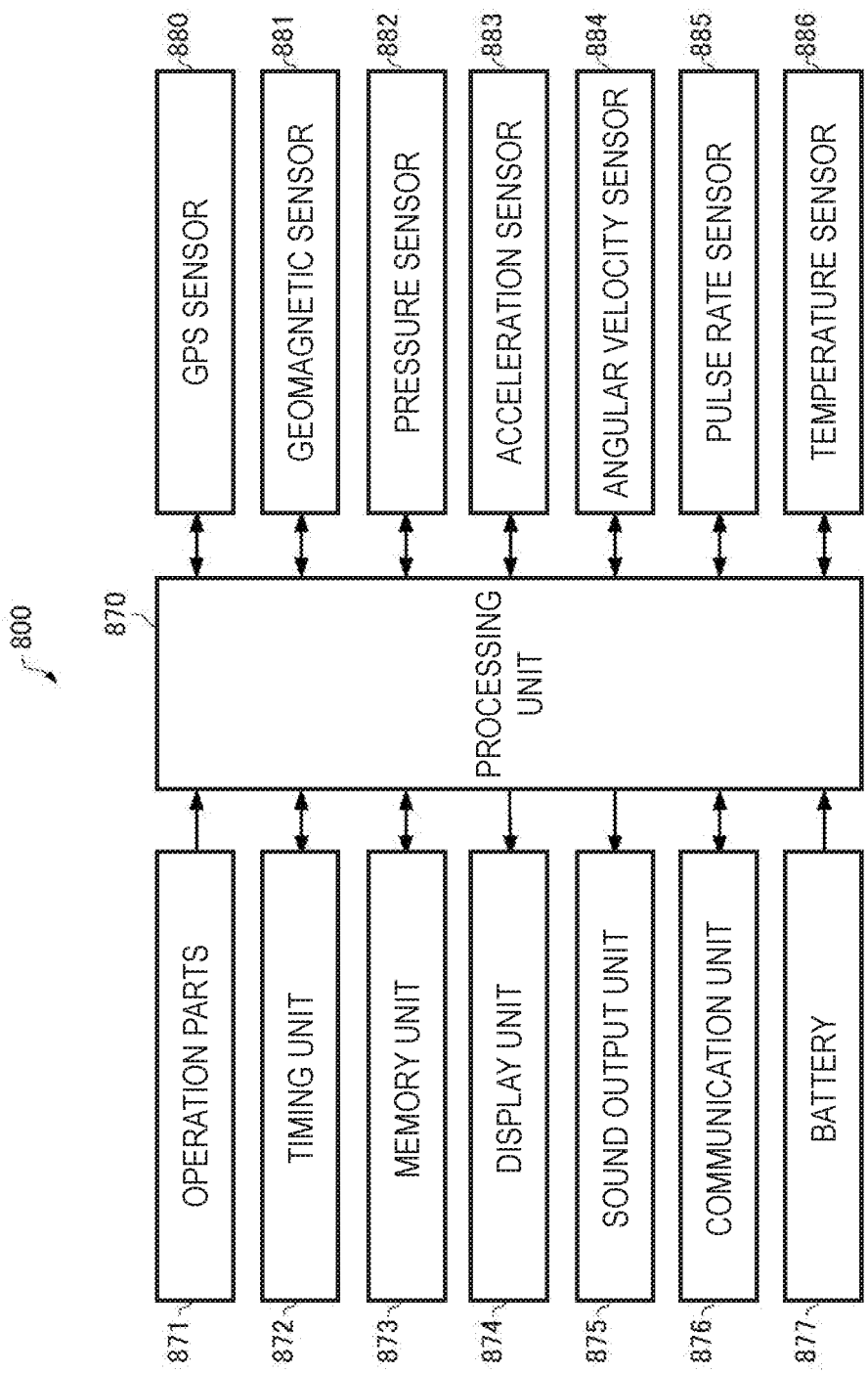
FIG. 15 is a functional block diagram of the wrist apparatus (wristwatch-type activity meter).

FIG. 15 is an example of a functional block diagram of the wrist apparatus 800. As shown in FIG. 15, the wrist apparatus 800 includes a processing unit 870, a GPS sensor 880, a geomagnetic sensor 881, a pressure sensor 882, an acceleration sensor 883, an angular velocity sensor 884, a pulse rate sensor 885, a temperature sensor 886, the operation parts 871, a timing unit 872, a memory unit 873, the display unit 874, a sound output unit 875, a communication unit 876, a battery 877, etc., and the respective parts are housed in the case. Note that, in the configuration of the wrist apparatus 800, part of the component elements may be removed or changed, or another component element may be added.

The communication unit 876 performs various kinds of control for establishing communications between the wrist apparatus 800 and another information terminal. The communication unit 876 includes a transceiver compliant with short-range wireless communication standards of Bluetooth (registered trademark) (including BTLE: Bluetooth Low Energy), Wi-Fi (registered trademark) (Wireless Fidelity), Zigbee (registered trademark), NFC (Near field communication), ANT+ (registered trademark), etc. and a connector compliant with communication bus standards of USB (Universal Serial Bus) etc.

The processing unit 870 (processor) includes e.g. an MPU (Micro Processing Unit), DSP (Digital Signal Processor), and ASIC (Application Specific Integrated Circuit). The processing unit 870 executes various kinds of processing based on the programs stored in the memory unit 873 and signals input from the operation parts 871. The processing by the processing unit 870 includes data processing on the respective output signals (output data) of the GPS sensor 880, the geomagnetic sensor 881, the pressure sensor 882, the acceleration sensor 883, the angular velocity sensor 884, the pulse rate sensor 885, the temperature sensor 886, and the timing unit 872, display processing of displaying an image by the display unit 874, sound output processing of outputting sound by the sound output unit 875, communication processing of communicating with an information terminal via the communication unit 876, electric power control processing of supplying electric power from the battery 877 to the respective parts, etc.

The processing unit 870 measures the total distance to which the user moves from the start of measurement by the high-accuracy GPS function. The processing unit 870 measures and displays the present pace of running of the user from the result of the distance measurement. The processing unit 870 calculates and displays the average speed from the start of running of the user to the present. The processing unit 870 measures and displays the altitude by the GPS function. The processing unit 870 measures and displays the stride length of the user even in a tunnel without GPS radio wave propagation. The processing unit 870 measures and displays the number of steps per minute (pitch) of the user. The processing unit 870 measures and displays the heart rate of the user by the pulse rate sensor. The processing unit 870 measures and displays the ground inclination in training and trail running in the mounting area by the user. The processing unit 870 automatically performs lap measurement (Auto Lap) when the user runs to a preset certain distance or in a preset certain time. The processing unit 870 displays the calorie consumption of the user. The processing unit 870 displays the total number of steps from the start of motion of the user.

The acceleration sensor 883 containing the physical quantity detection apparatus 1 according to the above described embodiment detects the respective accelerations in the three axis directions crossing (ideally, orthogonal to) one another and outputs signals (acceleration signals) according to the magnitude and directions of the detected three-axis accelerations. Or, the angular velocity sensor 884 containing the physical quantity detection apparatus 1 according to the above described embodiment detects the respective angular velocities in the three axis directions crossing (ideally, orthogonal to) one another and outputs signals (angular velocity signals) according to the magnitude and directions of the detected three-axis angular velocities.

Note that the above described wrist apparatus 800 uses the GPS (Global Positioning System) as the satellite positioning system, however, may use another global navigation satellite system (GNSS). For example, the apparatus may use one, two, or more of the satellite positioning systems of EGNOS (European Geostationary-Satellite Navigation Overlay Service), QZSS (Quasi Zenith Satellite System), GLONASS (GLObal NAvigation Satellite System), GALILEO, BeiDou (BeiDou Navigation Satellite System), etc. Or, a satellite-based augmentation system (SBAS) such as WAAS (Wide Area Augmentation System) or EGNOS (European Geostationary-Satellite Navigation Overlay Service) may be used for at least one of the satellite positioning systems.

5. Vehicle

Figure 16:
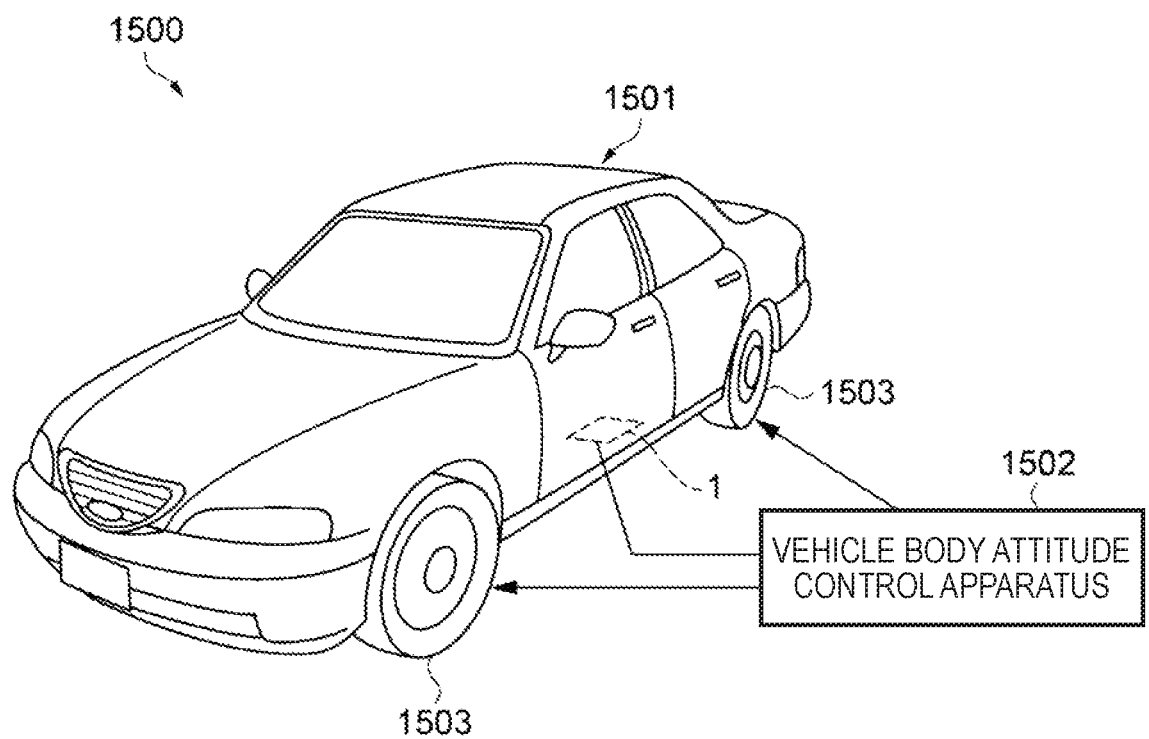
FIG. 16 shows an example of a vehicle of the embodiment (top view).

FIG. 16 is a perspective view showing a configuration of an automobile as an example of a vehicle of the embodiment. As shown in FIG. 16, the physical quantity detection apparatus 1 is mounted on an automobile 1500, and, for example, the attitude of a vehicle body 1501 may be detected by the physical quantity detection apparatus 1. The physical quantity signal output from the physical quantity detection apparatus 1 is supplied to a vehicle body attitude control apparatus 1502 as a control unit (attitude control unit) that controls the attitude of the vehicle body, and the vehicle body attitude control apparatus 1502 may detect the attitude of the vehicle body 1501 based on the signal and control hardness of the suspension and control brakes of individual wheels 1503 according to the detection result. Further, the physical quantity detection apparatus 1 may be widely applied to electronic control units (ECUs) including keyless entry, immobilizer, car navigation system, car air-conditioner, antilock brake system (ABS), airbag, tire pressure monitoring system (TPMS), engine control, control apparatus for automated driving inertial navigation, and battery monitor for hybrid car or electric car.

The physical quantity detection apparatus 1 applied to the vehicle may be used in e.g. attitude control of a bipedal walking robot or electric railcar, attitude control of a remote-controlled or autonomous flight vehicle such as a radio-controlled airplane, radio-controlled helicopter, and drone, and attitude control of an agricultural machine or construction machine in addition to the above described exemplifications. As described above, to realize the attitude control of various vehicles, the physical quantity detection apparatus 1 and the respective control units (not shown) are incorporated.

The vehicle contains the physical quantity detection apparatus 1 that can diagnose an abnormality of the physical quantity detection elements 2X, 2Y, 2Z even in motion and the control units (not shown), and thereby, reliability of control (attitude control or the like) based on changes in physical quantities by the control units may be improved.

The invention is not limited to the embodiments, but various modifications can be made within the scope of the invention.

The above described embodiments and modified examples are just examples, but the invention is not limited to those. For example, the respective embodiments and the respective modified examples can be appropriately combined.

The invention includes substantially the same configurations (e.g. configurations having the same functions, methods, and results or configurations having the same purposes and advantages) as the configurations explained in the embodiments. Further, the invention includes configurations in which non-essential parts of the configurations explained in the embodiments are replaced. Furthermore, the invention includes configurations that offer the same advantages or configurations that achieve the same purposes as those of the configurations explained in the embodiments. Moreover, the invention includes configurations in which known techniques are added to the configurations explained in the embodiments.

What is claimed is:

1. A physical quantity detection circuit comprising:
   a physical quantity signal generation circuit that generates a physical quantity signal according to magnitude of a physical quantity based on a detection signal output from a physical quantity detection element, the physical quantity detection element being configured to output the detection signal when an external force corresponding to the physical quantity is applied to the physical quantity detection element;
   an abnormality determination circuit that determines whether or not the physical quantity detection element is in a potentially abnormal state based on a value of the physical quantity signal and an amount of change of the value of the physical quantity signal;
   an abnormality diagnostic circuit that generates a test signal input to the physical quantity detection element and diagnoses whether or not the physical quantity detection element is in an abnormal state based on a test detection signal output from the physical quantity detection element in response to the test signal after the abnormality determination circuit determines that the physical quantity detection element is in the potentially abnormal state; and
   an interface circuit that transmits a diagnoses result of the abnormality diagnostic circuit to an external device, the diagnoses result corresponding to whether or not the physical quantity detection element is in the abnormal state,
   wherein, when the test signal is input to the physical quantity detection element, the physical quantity detection element is in a test state,
   the test state corresponds to a state in which a predetermined external force is applied to the physical quantity detection element, and the test detection signal corresponds to a physical quantity of the predetermined external force, and
   the abnormality diagnostic circuit compares the test detection signal with a predetermined expected value to diagnose whether or not the physical quantity detection element is in the abnormal state based on a result of the comparison.

2. The physical quantity detection circuit according to claim 1,
   wherein the abnormality determination circuit determines that the physical quantity detection element is in the potentially abnormal state when at least one of a first condition or a second condition is satisfied,
   the first condition is that an absolute value of the value of the physical quantity signal is equal to or larger than a predetermined first threshold value, and
   the second condition is that an absolute value of the amount of change of the value of the physical quantity signal is equal to or larger than a predetermined second threshold value.

3. The physical quantity detection circuit according to claim 2,
   wherein the predetermined first threshold value is equal to or larger than an absolute value of a value of the physical quantity signal generated when the physical quantity at the maximum in a detectable range is applied to the physical quantity detection element.

4. The physical quantity detection circuit according to claim 2,
   wherein the predetermined first threshold value is equal to or larger than 90% of an absolute value of a value of the physical quantity signal generated when the physical quantity at the maximum in a detectable range is applied to the physical quantity detection element.

5. The physical quantity detection circuit according to claim 2,
   wherein the predetermined second threshold value is equal to or larger than the predetermined first threshold value.

6. A physical quantity detection apparatus comprising:
   the physical quantity detection circuit according to claim 1; and
   the physical quantity detection element.

7. A physical quantity detection apparatus comprising:
   the physical quantity detection circuit according to claim 2; and
   the physical quantity detection element.

8. A physical quantity detection apparatus comprising:
   the physical quantity detection circuit according to claim 3; and
   the physical quantity detection element.

9. A physical quantity detection apparatus comprising:
   the physical quantity detection circuit according to claim 4; and
   the physical quantity detection element.

10. A physical quantity detection apparatus comprising:
    the physical quantity detection circuit according to claim 5; and
    the physical quantity detection element.

11. An inertial measurement device comprising:
    the physical quantity detection apparatus according to claim 6;
    a signal processing circuit that acquires the physical quantity signal output from the physical quantity detection apparatus and processes the physical quantity signal; and
    a communication circuit that externally transmits inertial data obtained by the processing of the signal processing circuit.

12. A vehicle positioning apparatus mounted on a vehicle and measuring a position of the vehicle, comprising:
    the inertial measurement device according to claim 11;
    a memory configured to store a program; and a processing unit configured to execute the program so as to:
- receive a satellite signal from a positioning satellite and acquire positioning information superimposed on the satellite signal;
- calculate the position of the vehicle based on the positioning information;
- calculate an attitude of the vehicle based on the inertial data output from the inertial measurement device; and
- correct the position based on the attitude.

13. A portable electronic apparatus comprising:
the physical quantity detection apparatus according to claim 6;
a case housing the physical quantity detection apparatus;
a processing unit housed in the case and processing output data from the physical quantity detection apparatus;
a display housed in the case; and
a light-transmissive cover that closes an opening of the case.

14. An electronic apparatus comprising:
the physical quantity detection apparatus according to claim 6; and
an arithmetic processing apparatus that performs arithmetic processing based on the physical quantity signal output from the physical quantity detection apparatus.

15. A vehicle comprising:
the physical quantity detection apparatus according to claim 6; and
an attitude controller that performs attitude control based on the physical quantity signal output from the physical quantity detection apparatus.

* * * * *